United States Patent
Yamabuchi et al.

(10) Patent No.: US 7,388,628 B2
(45) Date of Patent: Jun. 17, 2008

(54) LIQUID CRYSTAL PANEL, LIQUID CRYSTAL PANEL FABRICATION METHOD, LIQUID CRYSTAL PANEL FABRICATION APPARATUS, AND POLARIZING PLATE STICKING APPARATUS

(75) Inventors: Koji Yamabuchi, Nara (JP); Makoto Nakahara, Nara (JP); Akinori Izumi, Kitakatsuragi-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/524,769

(22) Filed: Sep. 20, 2006

(65) Prior Publication Data

US 2007/0013858 A1    Jan. 18, 2007

Related U.S. Application Data

(60) Division of application No. 10/789,755, filed on Feb. 27, 2004, now Pat. No. 7,202,923, which is a continuation-in-part of application No. 10/472,723, filed as application No. PCT/JP02/12140 on Nov. 20, 2002, now abandoned.

(30) Foreign Application Priority Data

| Nov. 27, 2001 | (JP) | ............................. 2001-360869 |
| Apr. 2, 2002 | (JP) | ............................. 2002-100219 |
| Mar. 20, 2003 | (JP) | ............................. 2003-078566 |

(51) Int. Cl.
*G02F 1/1333* (2006.01)
(52) U.S. Cl. ........................................ 349/96; 349/190
(58) Field of Classification Search ................ 349/96, 349/189–190
See application file for complete search history.

(56) References Cited

U.S. PATENT DOCUMENTS

| 4,061,418 | A |  | 12/1977 | Poensgen |
| 5,276,541 | A |  | 1/1994 | Terada et al. |
| 5,684,556 | A |  | 11/1997 | Shimamune |
| 5,710,609 | A |  | 1/1998 | Shimada |
| 5,963,289 | A |  | 10/1999 | Stefanov et al. |
| 2001/0026348 | A1 |  | 10/2001 | Murata et al. |
| 2001/0040667 | A1 |  | 11/2001 | Sasaki |
| 2004/0100612 | A1 | * | 5/2004 | Choo et al. ................. 349/192 |

FOREIGN PATENT DOCUMENTS

| JP | 51-89446 | 8/1976 |
| JP | 54-030051 | 3/1979 |
| JP | 57-052019 | 3/1982 |
| JP | 60192914 A | 10/1985 |
| JP | 62-2021 | 1/1987 |
| JP | 62-075420 | 4/1987 |

(Continued)

*Primary Examiner*—David Nelms
*Assistant Examiner*—Phu Vu
(74) *Attorney, Agent, or Firm*—David G. Conlin; William J. Daley, Jr.; Edwards Angell Palmer & Dodge

(57) ABSTRACT

A liquid crystal fabrication method includes the steps of: dropping liquid crystal on a first substrate at an upper surface inside regions enclosed by a sealing agent disposed thereon; overlaying a second substrate on the first substrate downward to stick the substrates together; sticking a polarizing plate on an upper surface of the first and second substrates; and collectively dividing the first and second substrates and the polarizing plate.

8 Claims, 24 Drawing Sheets

FOREIGN PATENT DOCUMENTS

| | | |
|---|---|---|
| JP | 01206417 A | 10/1989 |
| JP | 5216027 A | 8/1993 |
| JP | 06-194617 | 7/1994 |
| JP | 06342139 A | 12/1994 |
| JP | 07-181506 A | 7/1995 |
| JP | 08-087007 | 4/1996 |
| JP | 09-113562 | 5/1997 |
| JP | 09-120044 | 5/1997 |
| JP | 10-239694 | 9/1998 |
| JP | 11-295680 A | 10/1999 |
| JP | 11-33876 | 12/1999 |
| JP | 11-338376 | 12/1999 |
| JP | 11229376 | 12/1999 |
| JP | 411229376 | * 12/1999 |
| JP | 2000-221461 | 8/2000 |
| JP | 2001-075068 | 3/2001 |
| JP | 06-102505 A | 4/2001 |
| JP | 2001-133760 A | 5/2001 |
| JP | 2001-281678 | 10/2001 |
| JP | 2001-305348 | 10/2001 |

* cited by examiner

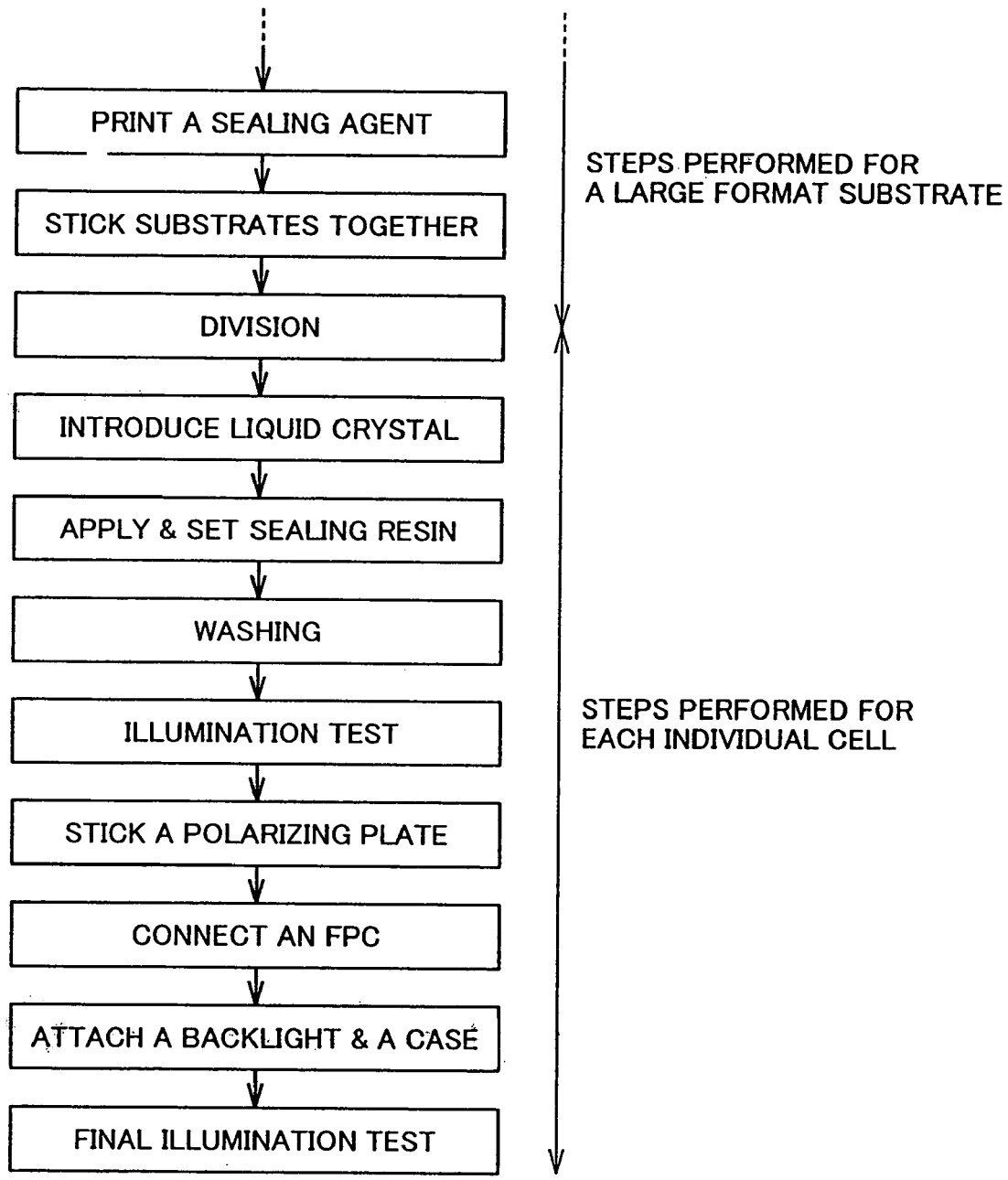

US 7,388,628 B2

LIQUID CRYSTAL PANEL, LIQUID CRYSTAL PANEL FABRICATION METHOD, LIQUID CRYSTAL PANEL FABRICATION APPARATUS, AND POLARIZING PLATE STICKING APPARATUS

CROSS-REFERENCE TO RELATED APPLICATIONS

This application is a divisional of U.S. application Ser. No. 10/789,755, filed Feb. 27,2004, now U.S. Pat. No. 7,202,923 which is a continuation-in-part of U.S. application Ser. No. 10/472,723, filed Sep. 18, 2003, now abandoned which was a National Stage Filing of PCT Application No. PCT/JP02/12140, filed Nov. 20, 2002, the teachings of all being incorporated herein by reference.

BACKGROUND OF THE INVENTION

1. Field of the Invention

The present invention relates to liquid crystal panels (also referred to as "liquid crystal display panels"), methods of fabricating the same, and apparatuses used to fabricate the same. Furthermore, the present invention relates to apparatuses used to stick a polarizing plate and particularly to apparatuses used in a liquid crystal panel fabrication process to stick a polarizing plate that is supplied in a roll.

2. Description of the Background Art

In general a liquid crystal panel has a structure formed of two glass substrates stacked one on the other in parallel and stuck together with a predetermined small gap posed therebetween and filled with liquid crystal. As a method of fabricating such a crystal panel, a conventional, general method will be described with reference to FIGS. 44-49. As shown in FIG. 44, when a thin film transistor (TFT) glass substrate 101 and a color filter (CF) glass substrate 102 are to be stuck together, a sealing agent 103 is arranged on one of the substrates. In the FIG. 44 example, TFT glass substrate 101 has a surface with sealing agent 103 adhesively fixed thereon. Sealing agent 103 is arranged in a frame to define a region to serve as a space confining liquid crystal (hereinafter referred to as a "liquid crystal cell"). It is, however, not completely closed. As shown in FIG. 44, it has an opening to serve as an inlet 116. TFT and CF glass substrates 101 and 102 are substrates having a large size allowing a plurality of crystal panels to be provided therefrom, and on the substrate a plurality of sealing agents 103 are arranged. Sealing agent 103 is thermosetting resin or the like.

TFT and CF glass substrates 101 and 102 are stuck together by sealing agent 103 and heated to allow sealing agent 103 to set to provide a large format substrate formed of the stuck substrates. TFT and CF glass substrates 101 and 102 are then divided for each individual region surrounded by sealing agent 103. Thus, as shown in FIG. 45, a substrate formed of substrates stuck together 114 and including a liquid crystal cell 115 is obtained. The substrate formed of substrates stuck together 114 is accommodated in a vacuum apparatus and liquid crystal cell 115 has its interior and exterior both vacuumed. Then, as shown in FIG. 46, inlet 116 defined by an opening of sealing agent 103 is immersed in liquid crystal 104 and the vacuum apparatus's internal atmosphere is gradually returned to atmospheric pressure. By a difference in pressure between the interior and exterior of liquid crystal cell 115, and capillarity, liquid crystal 104 is introduced into liquid crystal cell 115. Liquid crystal cell 115 is thus filled with liquid crystal 104. Subsequently, sealing resin 105, ultraviolet ray curing resin, is applied to inlet 116. Ultraviolet radiation is provided to illuminate sealing resin 105 to allow it to set to seal liquid crystal 104 in liquid crystal cell 115 to obtain the substrate formed of substrates stuck together 114, as shown in FIG. 47.

The substrate formed of substrates stuck together 114 is structured for example to have one side with a terminal portion (not shown) exposed. To this terminal portion a probe pin is connected, and an inspection is conducted. If the inspection does not reveal any abnormality, a polarizing plate 106 supplied in a sheet in a size corresponding to the substrate formed of substrates stuck together 114 is stuck on one or opposite sides of panel 114, as shown in FIG. 48. A liquid crystal panel 140 is thus obtained.

The conventional liquid crystal panel fabrication method is represented in a flow chart, as shown in FIG. 49. In FIG. 49, at the step of sticking a polarizing plate a liquid crystal panel is completed. Note that FIG. 49 also shows a process performed after the liquid crystal panel is completed. More specifically, by connecting a flexible printed circuit (FPC) to a terminal portion of the liquid crystal panel and attaching a backlight and a case, a liquid crystal display device is obtained.

However, the polarizing plate must be stuck slowly to prevent generation of static electricity. For example, sticking a single plate requires a time of approximately 8 to 10 seconds. In particular, a small size liquid crystal panel used for example in mobile phones is produced by dividing a single, large format glass substrate to provide several hundreds of liquid crystal panels. In that case, such a conventional art as described above requires a significantly increased number of operations in the steps for example of sticking the polarizing plate, conducting an inspection, and the like, which is significantly time consuming.

This disadvantage may be addressed, as disclosed in Japanese Patent Laying-Open No. 6-342139, by sticking a polarizing plate on an elongate substrate provided with regions arranged in a row to serve as cells, and then dividing the same for each cell. This method does provide a reduced cycle time for the step of sticking the polarizing plate (a reduced time required for the step of sticking the polarizing plate for a single liquid crystal panel). In recent years, however, a single large format glass substrate has also been used to produce several hundreds of liquid crystal panels, and in such a case the method employing the elongate substrate as described above does not provide a cycle time sufficiently effectively reduced.

Conventionally when a glass substrate of large size is used to produce liquid crystal panels of medium or small size the glass substrate has been divided into small pieces to form discrete cells and a polarizing plate has been stuck on each cell. This approach, however, requires sticking a polarizing plate on each single cell and also when the influence of static electricity is considered the apparatus cannot simply be rapidly operated. As such, to stick a single polarizing plate on one side of the cell, a time of approximately eight to ten seconds would be required. In addition, the substrate having been divided provides a large number of cells and a large number of apparatuses is accordingly required. As such it is desirable that in a condition with as many as cells included, collectively a polarizing plate is stuck thereon and then divided to achieve a significantly reduced cycle time of the step of sticking the polarizing plate.

More specifically, it is significantly effective if a collective polarizing plate can be stuck for example on a glass substrate divided in an elongate geometry to facilitate the step of introducing liquid crystal, a large size substrate formed by introducing liquid crystal in droplets and sticking substrates together, or a similar substrate. For example from a glass substrate having a side of 600 to 700 mm no less than 200 cells can be obtained, and when a polarizing plate is stuck on the glass substrate having a side of 600 to 700 mm it can be stuck thereon with efficiency increased by approximately double digits dramatically. Normally, a polarizing plate to be stuck on cells is previously cut in a form matching a single cell, and thereafter undergoes an inspection, one by one. As such the component costs significantly. If a polarizing plate supplied in a roll can be stuck on cells, not only can an inspection of discrete cells be eliminated but the dust that is caused when a substrate is cut into pieces can also be prevented.

Conventionally a rolled polarizing plate has been stuck on a glass substrate for example as disclosed in Japanese Patent Laying-Open No. 60-192914. Furthermore, an elongate polarizing plate has been stuck on a glass substrate by a method for example as disclosed in Japanese Patent Laying-Open No. 1-260417.

Japanese Patent Laying-Open No. 60-192914 discloses that a rolled polarizing plate is unrolled and a liquid crystal display panel is stuck directly thereon and subsequently the polarizing plate is cut. With this method, however, the polarizing plate has a large portion wasted. Furthermore, a portion unnecessary as a liquid crystal panel would also have a polarizing plate stuck thereon, which renders it difficult to perform a subsequent division step. To produce a transmission liquid crystal display device, in particular, it is necessary that a liquid crystal panel has opposite sides with a polarizing plate stuck thereon. The axes of polarization are orthogonal to each other and if the polarizing plate is large a marker (a reference for a division step to provide cells) provided in a glass substrate cannot be read.

Furthermore in such a configuration as disclosed in Japanese Patent Laying-Open No. 1-260417 if the substrate and the polarizing plate are of large size a pneumatic chuck mechanism moving the elongate polarizing plate and a press for half-cutting are spaced wide apart and consequently the apparatus itself would have a significantly increased size disadvantageously.

Furthermore, the apparatus described in Japanese Patent Laying-Open No. 1-260417 cuts a polarizing plate first in a strip and then in a size in accordance with a liquid crystal display device. The polarizing plate needs to be cut twice and the apparatus is accordingly required to have an increased size disadvantageously.

SUMMARY OF THE INVENTION

A first object of the present invention is to reduce a period of time required to produce a single liquid crystal panel when a large number of such liquid crystal panels are collectively produced.

A second object of the present invention is to provide an apparatus that can stick a polarizing plate on a substrate at a desired portion with a reduced number of steps and hence more efficiently.

To achieve the first object the present invention in one aspect provides a liquid crystal panel including: a first substrate; a second substrate overlapping the first substrate with a liquid crystal layer posed therebetween; a sealing agent disposed between the first and second substrates to surround the liquid crystal layer; and a polarizing plate stuck on at least one of the first and second substrates at a surface opposite the liquid crystal layer. The polarizing plate has an end receding from an end of one substrate and having a surface inclined. Alternatively, the present invention in another aspect provides a liquid crystal panel including: a first substrate; a second substrate overlapping the first substrate with a liquid crystal layer posed therebetween; a sealing agent disposed between the first substrate and the second substrate to surround the liquid crystal layer; and a polarizing plate stuck on at least one of the first and second substrates at a surface opposite the liquid crystal layer, wherein the polarizing plate has an end receding from an end of one substrate, and at the polarizing plate's end, glue bonding the polarizing plate and the substrate together is exposed and extends in a direction. Thus the polarizing plate is stuck collectively on a large format substrate formed of substrates stuck together and then along a line to be followed for division the polarizing plate is scraped off and then the substrate is provided with a crack and divided into individual liquid crystal panels. The liquid crystal panels can be fabricated effectively.

In the present invention preferably the sealing agent continuously surrounds an entire perimeter of the liquid crystal layer. As such, a large format substrate having a surface previously provided with a sealing agent forming an enclosure that has received liquid crystal dropped therein and another substrate can be stuck together to collectively fabricate a plurality of liquid crystal cells to provide an efficiently producible liquid crystal panel.

In the present invention preferably the first substrate has a terminal portion protruding outer than the second substrate. The first substrate has a surface with the polarizing plate stuck thereon. The polarizing plate also extends on a back side of the terminal portion. Thus the polarizing plate is stuck collectively on a large format substrate formed of substrates stuck together and then along a line to be followed for division the polarizing plate is scraped off and then the substrate is provided with a crack and divided into individual liquid crystal panels. The liquid crystal panels can be fabricated effectively.

In the present invention preferably the first substrate has a terminal portion projecting outer than the second substrate, the first substrate at a display area and the terminal portion has a polarizing plate stuck thereon, and the first substrate between the display area and the terminal portion has a region free of the polarizing plate.

To achieve the first object the present invention provides a method of fabricating a liquid crystal panel, including the steps of: placing a sealing agent on a surface of a first substrate in a form of an enclosure; introducing liquid crystal on the first substrate in a region enclosed by the sealing agent or on a second substrate in a region corresponding to the region located on the first substrate enclosed by the sealing agent; sticking the first substrate and the second substrate together to form a substrate formed of the first substrate and the second substrate; sticking a polarizing plate on at least one of the first substrate and the second substrate; and dividing the substrate to have a geometry providing a plurality of liquid crystal panels. In accordance with the present invention in fabricating a liquid crystal cell and sticking a polarizing plate a large format substrate including a plurality of liquid crystal cells can exactly be used to collectively do so. Liquid crystal cells can effectively be produced.

In the present invention preferably in the step of dividing, at least one of the first substrate and the second substrate has the polarizing plate partially removed to allow the substrate to have a surface exposed and the first substrate and the second substrate are then divided. This can prevents the substrate from cracking at an undesired position and the polarizing plate from undesirably peeling off. The substrate can efficiently and accurately be divided into individual crystal panels.

In the present invention preferably the step of dividing is preceded by the step of collectively inspecting liquid crystal cells defined by the sealing agent, via an interconnection electrically connected to each liquid crystal cell for inspection. Conventionally, individual liquid crystal panels are each inspected. In the present invention, a plurality of liquid crystal panels can collectively, simultaneously be inspected. This can provide a reduced inspection time required per liquid crystal panel.

In the present invention preferably the step of inspecting is performed after the step of overlaying and before the step of sticking.

In the present invention preferably the step of inspecting is performed after the step of sticking.

In the present invention preferably there is included the step of exposing a terminal portion provided at the first substrate. This allows a terminal to be exposed at the terminal portion so that from this terminal a signal for an inspection can be supplied so as to facilitate the inspection.

In the present invention preferably the step of exposing is performed in the step of overlaying by displacing the substrates from each other. A terminal portion can be exposed without dividing the substrate.

In the present invention preferably the step of exposing is performed after the step of overlaying by dividing and partially removing one of the substrates. This ensures that if substrates of the same size are stuck together the terminal portion can be exposed at a desired position.

To achieve the first object the present invention provides a liquid crystal panel fabrication apparatus including: means for placing a sealing agent on a surface of a first substrate in a form of an enclosure; means for introducing liquid crystal on the first substrate in a region enclosed by the sealing agent or on a second substrate in a region corresponding to the region located on the first substrate enclosed by the sealing agent; means for sticking the first substrate and the second substrate together to form a substrate formed of the first substrate and the second substrate; means for sticking a polarizing plate on at least one of the first substrate and the second substrate; and means for dividing the substrate formed of the first and second substrates to have a geometry providing a plurality of liquid crystal panels. Substrates of a large format can collectively be stuck together to form a substrate formed of the stuck substrates and including a plurality of liquid crystal cells and a polarizing plate can collectively be stuck thereon so that a large number of liquid crystal cells can efficiently be produced.

To achieve the second object the present invention provides an apparatus sticking a polarizing plate, including: means holding a roll of a polarizing plate formed in a strip; means cutting in a geometry of a liquid crystal substrate the polarizing plate continuously extracted from the roll; and means sticking on the liquid crystal substrate the polarizing plate cut. The apparatus thus configured extracts a polarizing plate in the form of a strip continuously extracted from a roll and cuts the polarizing plate in the geometry of a liquid crystal substrate. This cut substrate is stuck on the liquid crystal substrate by the sticking means so that from the polarizing plate in the form of the strip a polarizing plate that follows the liquid crystal substrate can immediately be obtained. As the cut polarizing plate can immediately be stuck on the liquid crystal substrate at a desired portion, the polarizing plate can be stuck on the substrate significantly more efficiently.

Still preferably the roll is a roll of a combination of a support and the polarizing plate overlying the support, and the means cutting does not cut the support in cutting the polarizing plate.

Still preferably the apparatus sticking the polarizing plate further includes means detecting an axis of polarization of the polarizing plate unrolled. The means cutting is driven by a direction of an axis of polarization detected by the detection means to adjust a direction followed to cut the polarizing plate. As such, the polarizing plate can be cut in accordance with the direction of the axis of polarization so that the direction of the axis of polarization of the cut polarizing plate can be recognized. As a result, a high quality liquid crystal display device allowing a direction of an axis of polarization to be controlled with precision can be provided.

Still preferably the means cutting cuts the polarizing plate to have a size substantially equal to that of the liquid crystal substrate. Still preferably the means cutting includes press means. Still preferably the means cutting includes a linear blade. Still preferably the linear blade is attached to the means sticking.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawing:

FIG. 49 is a flow chart of the method of fabricating the liquid crystal panel in accordance with the conventional art.

DESCRIPTION OF THE PREFERRED EMBODIMENTS

First Embodiment

Method of Fabrication

Figure 44:
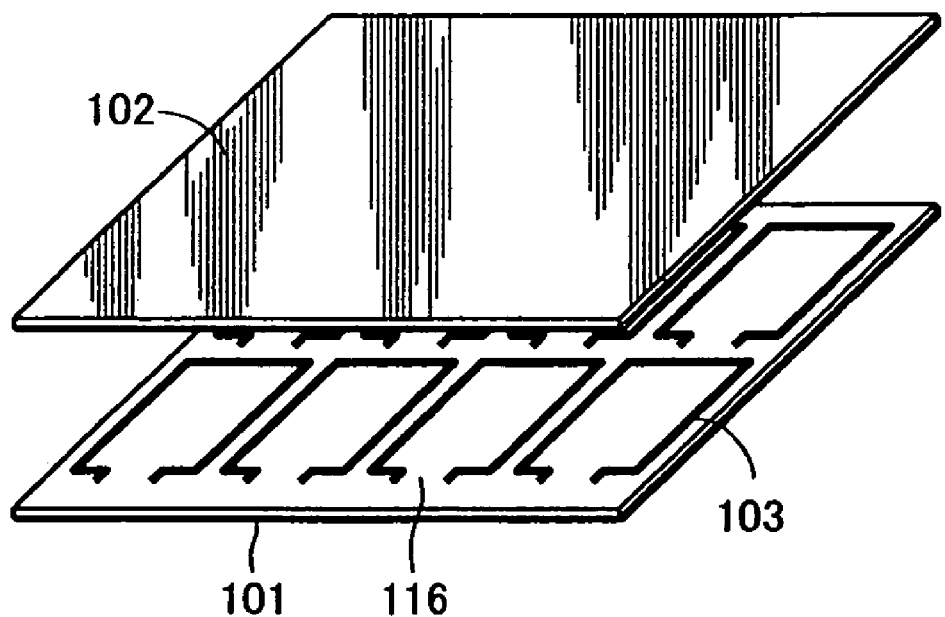
FIG. 44 is a first illustration of a method of fabricating a liquid crystal panel in accordance with conventional art.
Figure 45:
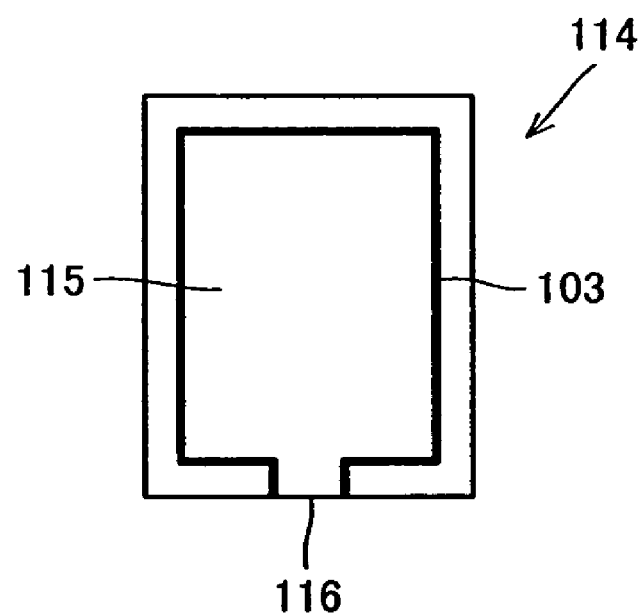
FIG. 45 is a plan view of substrates stuck together, as obtained in the course of the method of fabricating the liquid crystal panel in accordance with the conventional art.
Figure 46:
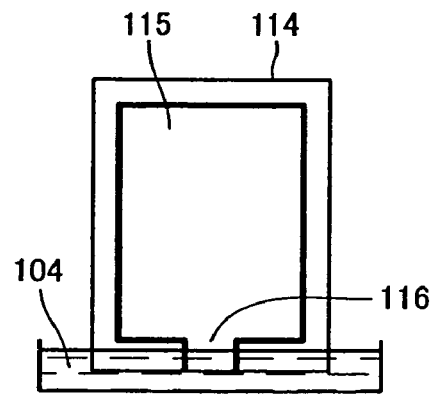
FIG. 46 is a second illustration of the method of fabricating the liquid crystal panel in accordance with the conventional art.
Figure 47:
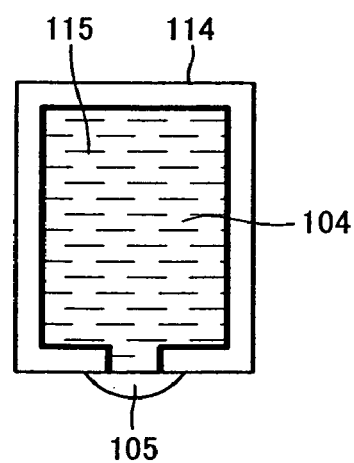
FIG. 47 is a third illustration of the method of fabricating the liquid crystal panel in accordance with the conventional art.
Figure 48:
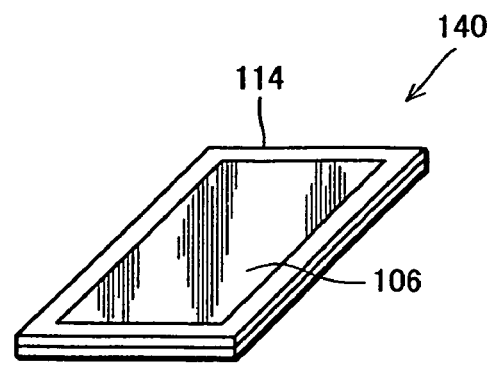
FIG. 48 is a fourth illustration of the method of fabricating the liquid crystal panel in accordance with the conventional art.

With reference to FIGS. 1-17 the present invention in a first embodiment provides a liquid crystal panel fabrication method as will be described hereinafter. Initially, TFT glass substrate 101 and CF glass substrate 102 are stuck together. More specifically, before the substrates are stuck together, sealing agent 103 is arranged on one of the two substrates. Sealing agent 103 may be applied by means of a dispenser through a small syringe or it may be applied by screen-printing. In the FIG. 1 example, TFT glass substrate 101 has a surface having sealing agent 103 arranged thereon. Sealing agent 103 is arranged to surround continuously an entire periphery of a region to be provided with a liquid crystal layer. In other words, this sealing agent 103 does not have the opening that the conventional sealing agent 103 shown in FIG. 44 does. The present invention exhibits a particularly significant effect when a large format substrate is used to produce medium- and small-size liquid crystal panels therefrom in large numbers. Such medium- and small-size liquid crystal panels are mainly applied in mobile phones, car navigation systems and the like, which are required to endure temperature higher than office automation equipment, which mainly employs a large size crystal panel. Accordingly, sealing agent 103 is formed for example of heat-resistive, photo-curing resin or the like. Alternatively, sealing agent 103 may be thermosetting resin or resin of a type set by light and heat applied together.

Common Transition Electrode

TFT and CF glass substrates 101 and 102 are both provided with electrodes, respectively, for applying voltage to liquid crystal. When a liquid crystal panel is completed, however, desirably, a terminal portion provided only at one substrate exclusively is used to externally extract the electrodes. Accordingly, from the substrate without the terminal to the substrate with the terminal the electrode need to be extracted. To do so, a common transition electrode is used.

Figure 2:
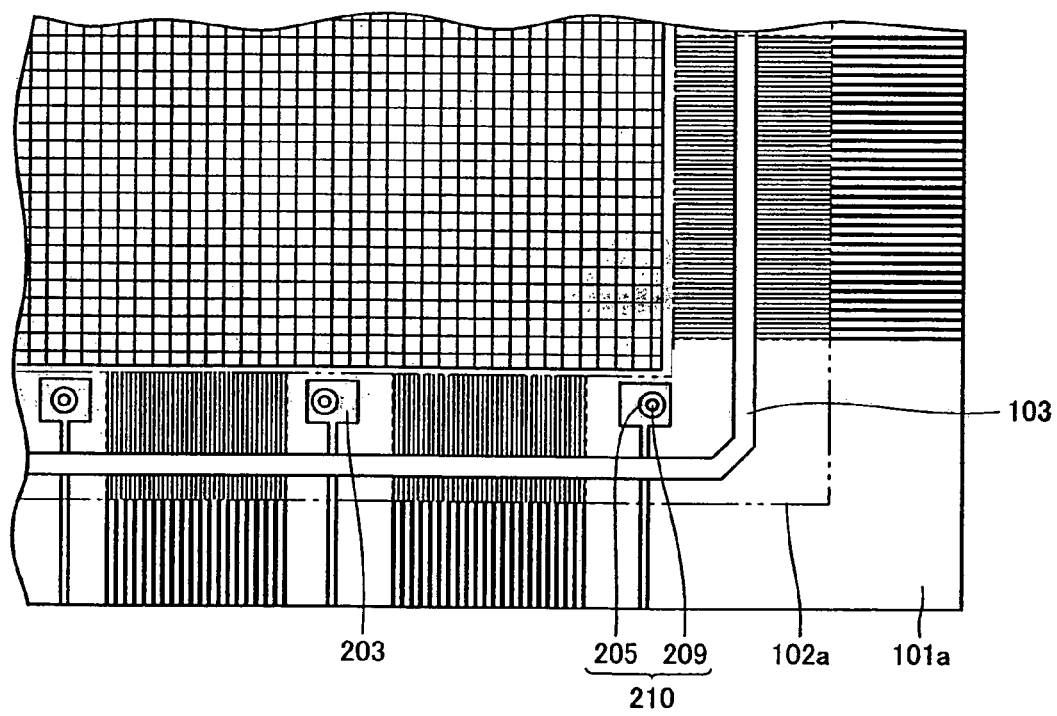
FIG. 2 is a partial, plan view of the liquid crystal panel in accordance with the present invention in the first embodiment.

The "common transition electrode" is an electrode posed between glass substrates opposite with a liquid crystal layer posed therebetween to allow electrical conduction between electrodes of surfaces of the glass substrates, respectively. Although the glass substrates before they are stuck together are large format substrates that have not yet been divided into individual liquid crystal panels, for the sake of illustration the substrates are divided into individual liquid crystal panels and a portion of one such liquid crystal panel is shown in FIG. 2, enlarged. Inside sealing agent 103 on glass substrate 110a, 102a a plurality of common electrode pads 203 are arranged having their respective, small, round common transition electrodes 210 arranged therein. From common electrode pad 203 an interconnection extends across sealing agent 103 toward an outer edge of the liquid crystal panel. Common transition electrode 210 is configured to include at the center a small, round, conductive granule 209 having an external surface wrapped with a conductive material 205.

Figure 3:
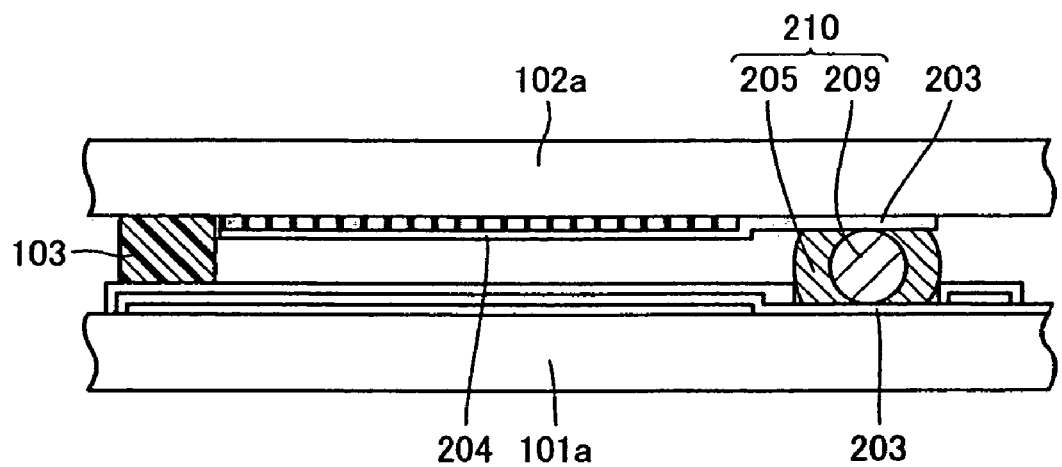
FIG. 3 is a partial cross section of the liquid crystal panel in accordance with the present invention in the first embodiment.

When the substrates are stuck together, common transition electrode 210 is sandwiched between upper and lower common electrode pads 203 and squashed thereby. As a result, as shown in FIG. 3 in cross section, with conductive granule 209 interposed, upper and lower glass substrates 101a and 102a face each other, and conductive material 205 having been squashed and deformed surrounds conductive granule 209. Electrical conduction is thus achieved between the electrode on a surface of glass 30 substrate 101a and that on a surface of glass substrate 102a. Note that FIG. 3 is provided to show common transition electrode 210 squashed and as a liquid crystal panel it is a cross section in an example in configuration different from FIG. 2. In the present embodiment a liquid crystal panel is fabricated by overlaying glass substrates on each other in a vacuum and recovering the atmospheric pressure to use the pressure to stick the substrates together. With this pressure exerted, an ultraviolet ray is directed or heat is applied to allow the sealing agent to set.

Step of Dropping Liquid Crystal and Step of Sticking Substrates Together

Figure 1:
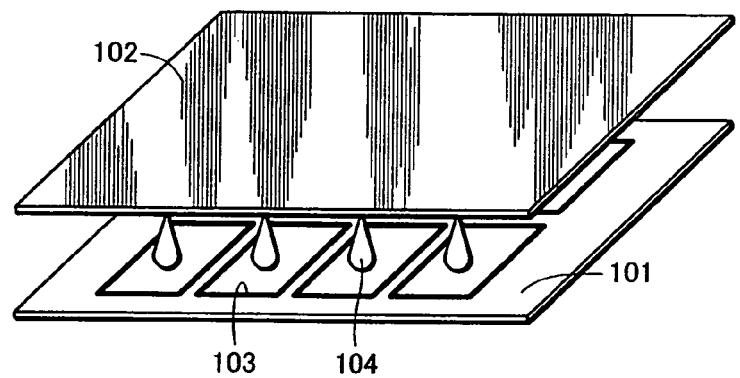
FIG. 1 is a first illustration of a method of fabricating a liquid crystal panel in accordance with the present invention in a first embodiment.

In the step of dropping liquid crystal, as shown in FIG. 1, liquid crystal 104 is dropped on TFT glass substrate 101 inside sealing agent 103 or on opposite CF glass substrate 102 at a location corresponding to inside a portion with which the sealing agent is to brought into contact. Liquid crystal 104 is dropped by an amount matching the volume of a cell and accumulates inside sealing agent 103. Then in the step of sticking the substrate together glass substrate 102 is laid on grass substrate 101 in a vacuum and exposed for example to ultraviolet light and heated if necessary to allow sealing agent 103 to set to hermetically seal liquid crystal 104 in the cell. Thus a large format substrate 30 formed of the substrates stuck together is obtained (see FIG. 4).

Step of Sticking a Polarizing Plate

Figure 4:
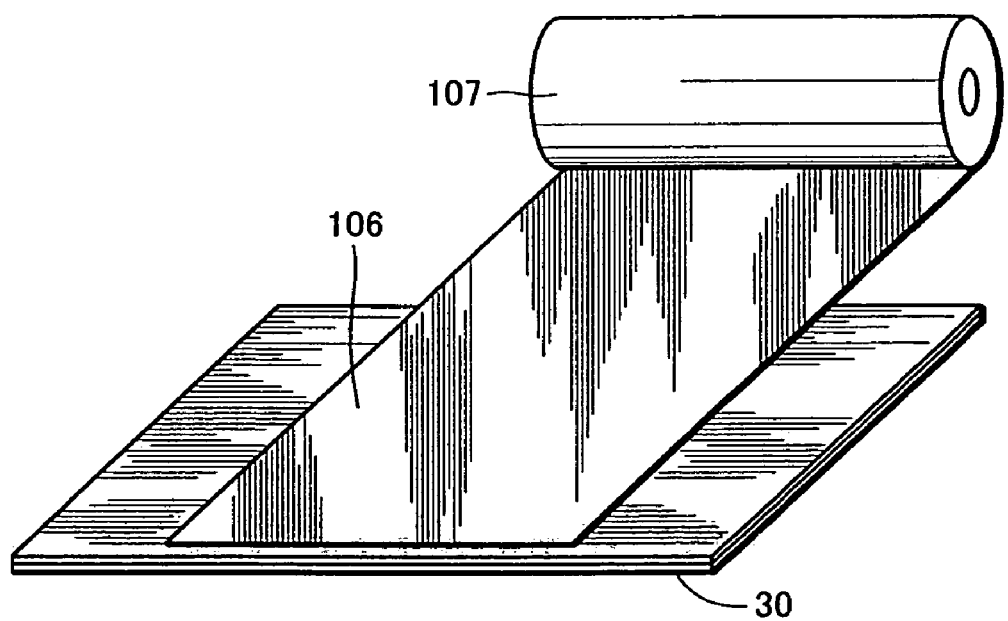
FIG. 4 is a second illustration of the method fabricating the liquid crystal panel in accordance with the present invention in the first embodiment.

The substrates are stuck together to obtain large format substrate 30. Substrate 30 then has a surface washed. In the step of sticking a polarizing plate, as shown in FIG. 4, a polarizing plate 106 is stuck on a surface of substrate 30. Polarizing plate 106 is supplied from a roll 107 of the polarizing plate for large format substrate 30. If a liquid crystal panel to be fabricated is of reflective type, polarizing plate 106 may be stuck on one side alone of substrate 30. If the liquid crystal panel is of transmission type, polarizing plate 106 is stuck on opposite sides of substrate 30.

Figure 5:
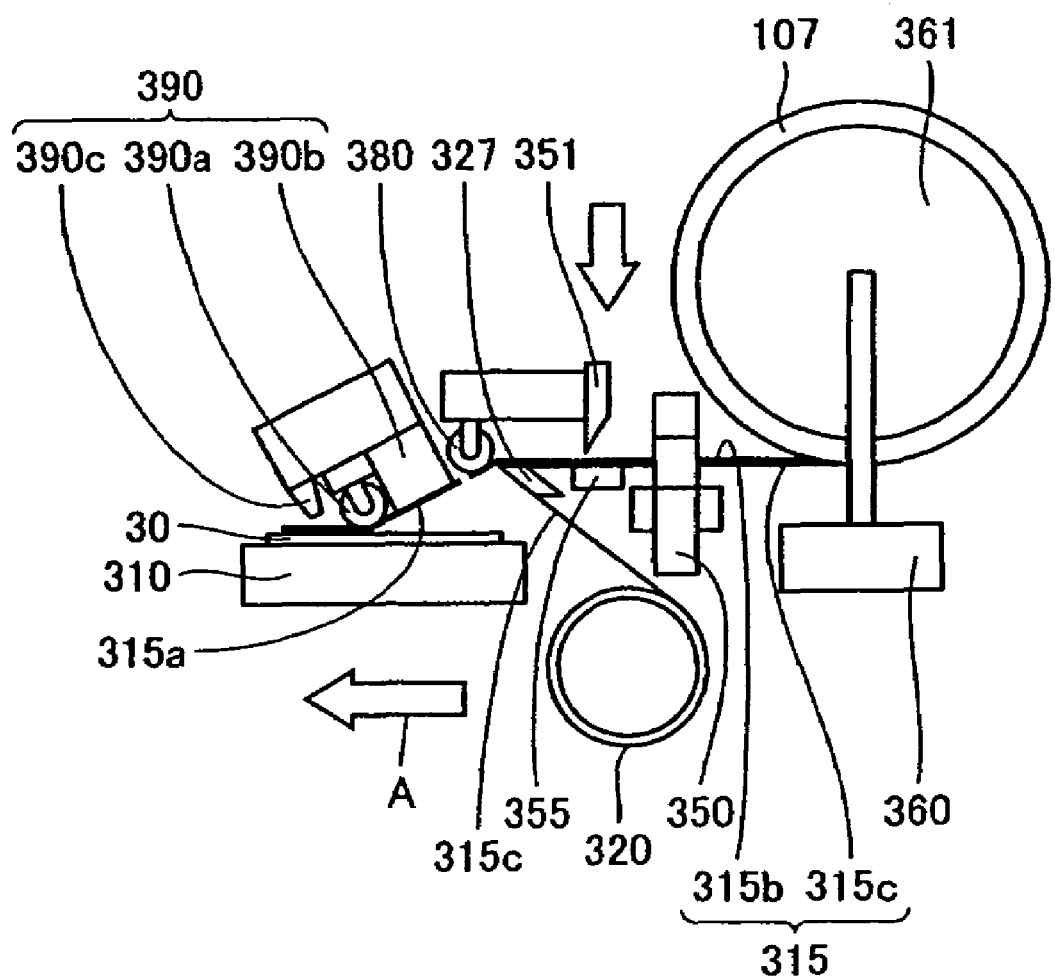
FIG. 5 illustrates equipment for performing the step of sticking a polarizing plate that is employed in the method of fabricating the liquid crystal panel in accordance with the present invention in the first embodiment.

Equipment used to stick the polarizing plate will be described with reference to FIG. 5 more specifically. Roll 107 of the polarizing plate is supported by a reel 361 supported by a holding means 360. A polarizing plate 315b is overlaid on a separator 315c to provide a combination 315 of the two and supplied in roll 107 supplying the polarizing plate. Initially, combination 315 is extracted from roll 107 and moves past a detector 350 detecting a direction of an axis of polarization of polarizing plate 315b. On a cutting stage 355 a cutting blade 351 moves downward toward combination 315. Blade 351 does not cut separator 315c and only cuts polarizing plate 315b overlying the separator. Separator 315c is guided by a peeling member 327 in a direction different than polarizing plate 315b and taken up on a take up roll 320. Polarizing plate 315b with separator 315c peeled off proceeds and then pressed by a guide roller 380 to move in a slightly downward direction. A head 390 operating to stick the polarizing plate on a substrate includes a press and contact roller 390a, a suction platform 390b and a position detection sensor 390c. Polarizing plate 315b slides on a surface of suction platform 390b, moves past under roller 390a and is thus guided to position detection sensor 390c for detection, while a polarizing plate sticking stage 310 is moved upward to bring substrate 30 on stage 310 into contact with polarizing plate 315b. Stage 310 can be moved in a direction indicated by an arrow A to stick polarizing plate 315b on substrate 30. Note that in accordance with a direction of an axis of polarization detected by detector 350 stage 310 can be rotated to stick polarizing plate 315b in accordance with a direction of an axis of polarization required for substrate 30.

Polarizing plate 315b can be stuck only at a portion pressed by roller 390a against substrate 30 to prevent air bubbles from entering therebetween. While in this example polarizing plate 315b is cut with blade 351, it may alternatively be cut by laser, which can advantageously be used as it does not produce chips. Polarizing plate 315b that is supplied in roll 107 allows a continuous sticking operation. Separator 315 can be peeled off polarizing plate 315b immediately before the polarizing plate is stuck on the substrate to prevent the polarizing plate from having a surface with dust thereon. In the step of sticking the polarizing plate, desirably, not only is polarizing plate 315b stuck on substrate 30 but thereafter to eliminate air bubbles and the like substrate 30 is also subjected to a pressurization, degassing apparatus.

Furthermore the step of sticking a polarizing plate is not limited to sticking a polarizing plate fed from a role as described above. The polarizing plate may also be fed in the form of an optical correction film cut to have substantially the same size as the substrate. Alternatively, it may be cut to have a size approximately equal to a total area of a plurality of liquid crystal cells. Alternatively, it may be cut to have an area larger than that of at least a single liquid crystal cell.

Step of Exposing a Terminal Portion

Figure 6:
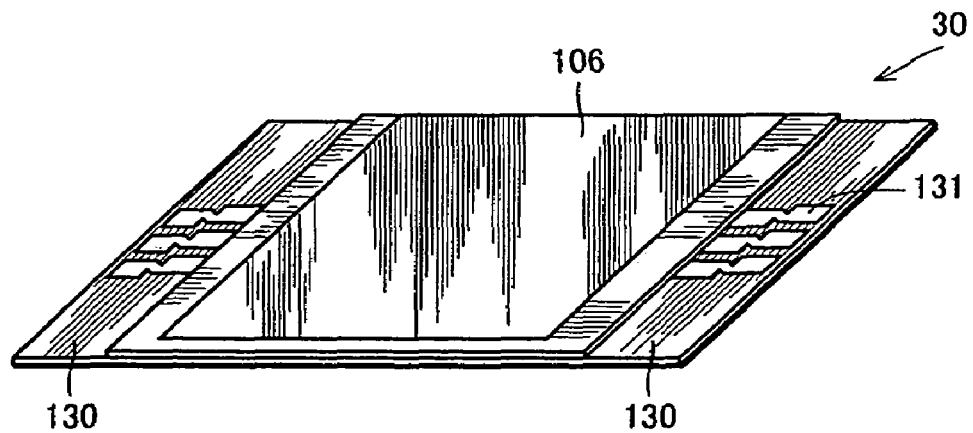
FIG. 6 illustrates a first method of exposing a terminal portion for inspection in the method of fabricating the liquid crystal panel in accordance with the present invention in the first embodiment.
Figure 7:
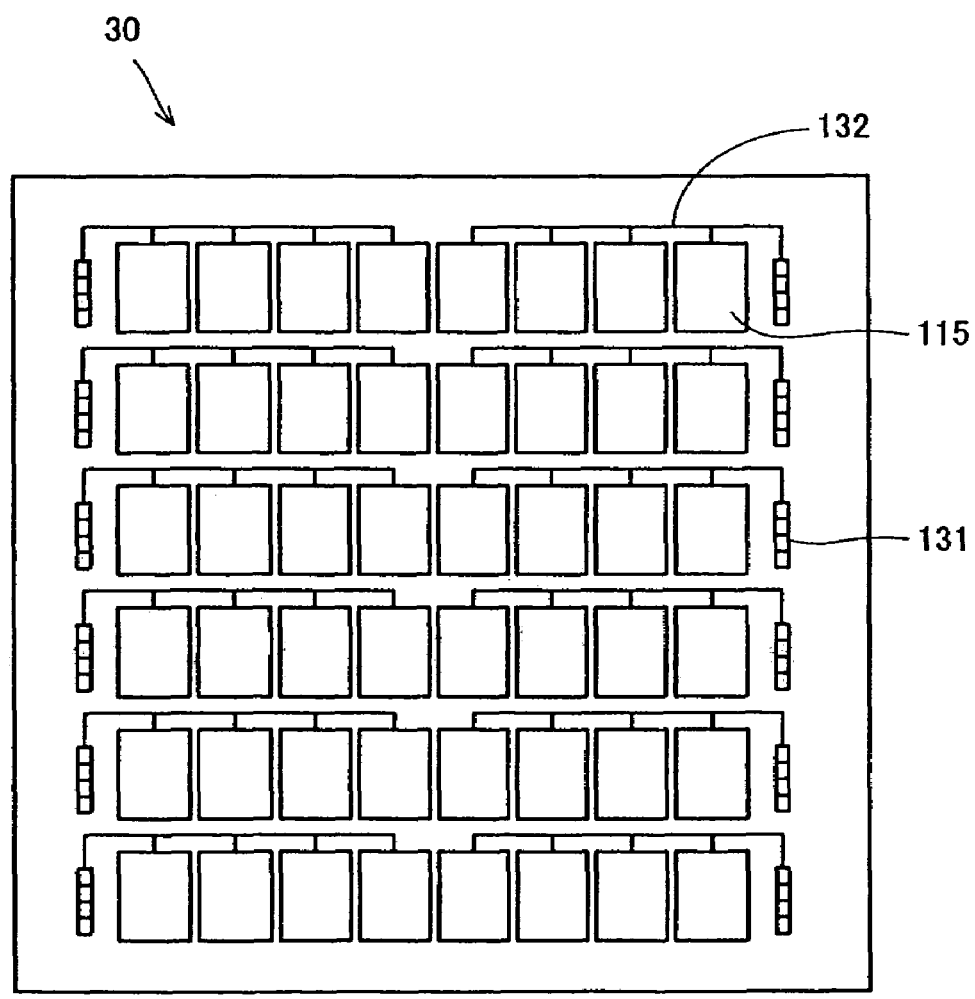
FIG. 7 is a plan view of substrates stuck together, as obtained in the course of the method of fabricating the liquid crystal panel in accordance with the present invention in the first embodiment.

In the step of exposing a terminal portion, an inspection terminal portion 130 is exposed at an end of large format substrate 30 formed of substrates stuck together. Inspection terminal portion 130 is a region corresponding to a protrusion of one of the two glass substrates. In inspection terminal portion 130 an inspection terminal 131 is arranged. Inspection terminal portion 130 is exposed by a method, as follows: initially, as shown in FIG. 6, one of the glass substrates that is not provided with inspection terminal 131 is sized to be smaller than the other that is provided with inspection terminal 131 and the glass substrates are superimposed on each other. As shown in FIG. 7, from inspection terminal 131 an inspection interconnection 132 extends toward each liquid crystal cell 115 included in substrate 30. Note that inspection terminals 131 is not limited in number, position or the like to the FIG. 7 example.

Figure 8:
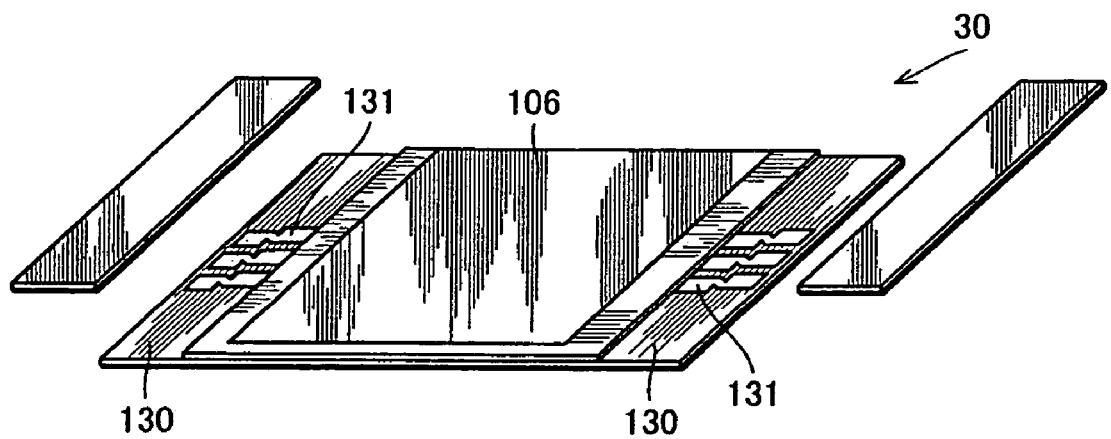
FIG. 8 illustrates a second method of exposing a terminal portion for inspection in the method of fabricating the liquid crystal panel in accordance with the present invention in the first embodiment.
Figure 9:
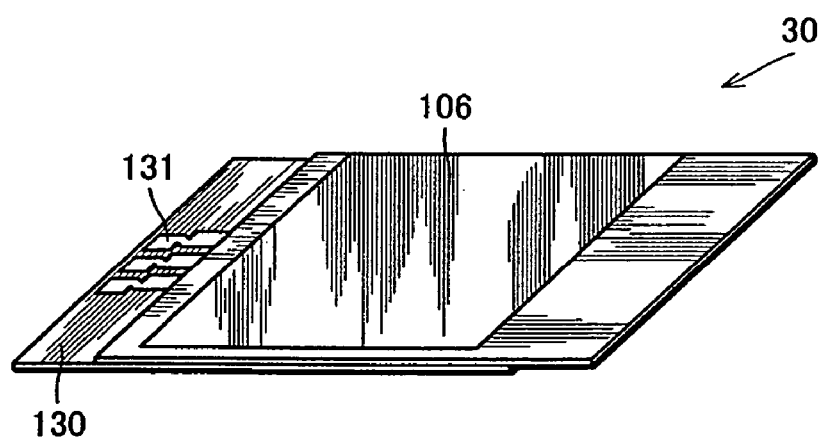
FIG. 9 illustrates a third method of exposing a terminal portion for inspection in the method of fabricating the liquid crystal panel in accordance with the present invention in the first embodiment.

Inspection terminal portion 130 can be exposed by another method. As shown in FIG. 8, substrate 30 formed of two substrates stuck together has an end having only one substrate cut off and removed. Inspection terminal portion 130 can be exposed by still another method. As shown in FIG. 9, the substrates are offset and stuck together to expose inspection terminal portion 130. For the first and third methods the step of exposing the terminal portion will be included in the step of sticking the substrates together.

Step of Collective Inspection

Then, in the step of collective inspection, a probe pin is connected to inspection terminal 131 exposed and a drive signal for an illumination test is supplied to cause liquid crystal cells 115 in substrate 30 to collectively illuminate. Since this test is conducted with large format substrate 30, portions corresponding to a plurality of liquid crystal panels can be inspected at a time. By applying the drive signal for the illumination test, a defective pixel, a point defect, and an uneven indication can be found. When liquid crystal cell 115 is found to be defective, information thereof is supplied to a production management system by a computer to prevent the process from proceeding with the subsequent step to further perform an operation uselessly.

In the step of the collection inspection, liquid crystal cell 115 located at a center of large format substrate 30 is distant from inspection terminal 131 and may suffer a delay of the signal, as compared with liquid crystal cell 115 located at a periphery of substrate 30. To prevent this, desirably at a portion directed to liquid crystal cell 115 distant from inspection terminal 131 inspection interconnection 132 has a bus line with an increased width.

Figure 22A:
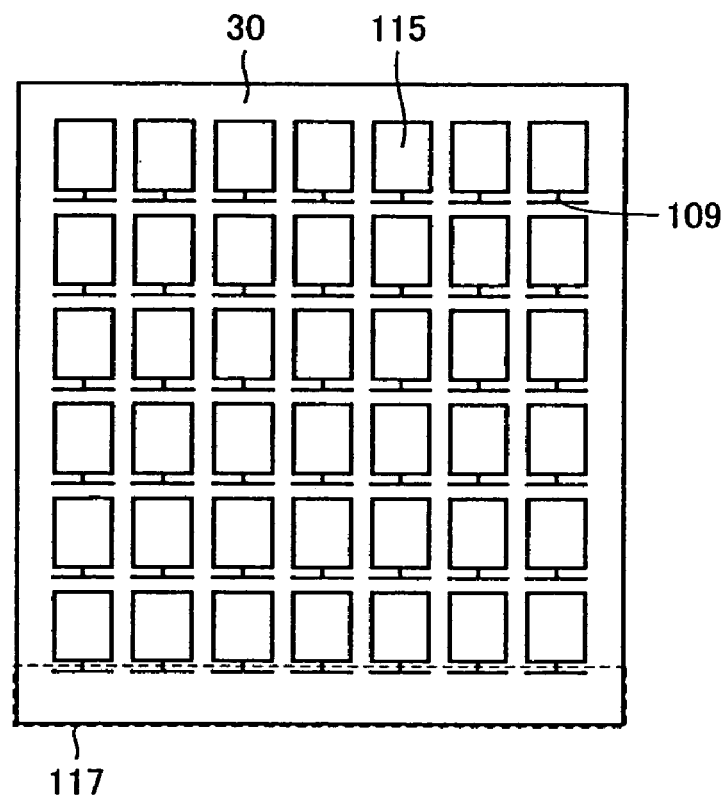
FIGS. 22A and 22B are views for illustrating only a single row of liquid crystal cells undergoing an illumination test in the method of fabricating a liquid crystal panel in accordance with the present invention in the first embodiment.
Figure 22B:

While in the present description the step of collective inspection causes all of the liquid crystal cells included in large format substrate 30 to illuminate for inspection, if it is sufficient to detect only a significant defect then only a single row of liquid crystal cells may be illuminated. In that case, as shown in FIGS. 22A and 22B, large format substrate 30 has exposed an inspection terminal portion 117, a region at which terminals corresponding to all of the liquid crystal cells 115 of a single row or column arranged along any one of outermost sides, are collected. A probe pin is brought into contact with inspection terminal portion 117. Thus a single row or column of liquid crystal cells 115 alone can be subjected to the illumination test.

Step of Division

Then, in the step of division, substrate 30 is divided in a size of individual liquid crystal panels. In this division step, the two glass substrate stuck together and polarizing plate 106 stuck on a surface thereof are collectively divided. As a result, each liquid crystal panel is divided for each liquid crystal cell 115.

Figure 11:
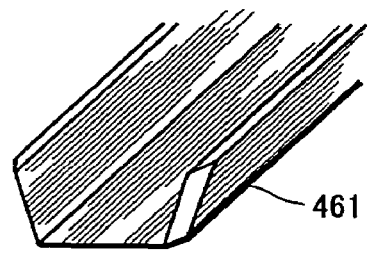
FIG. 11 is a perspective view of a first exemplary blade used in the method of fabricating the liquid crystal panel in accordance with the present invention in the first embodiment.
Figure 12:
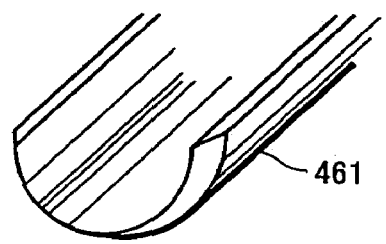
FIG. 12 is a perspective view of a second exemplary blade used in the method of fabricating the liquid crystal panel in accordance with the present invention in the first embodiment.
Figure 13:
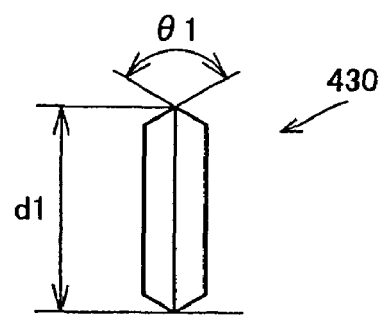
FIG. 13 is a side view of a wheel cutter used in the method of fabricating the liquid crystal panel in accordance with the present invention in the first embodiment.
Figure 14:
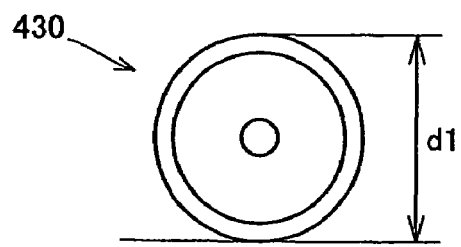
FIG. 14 is a front view of the wheel cutter used in the method of fabricating the liquid crystal panel in accordance with the present invention in the first embodiment.

Equipment used to perform the division step will be described with reference to FIG. 10 more specifically. A movable unit 410 includes a cutting mechanism 460 at a front side and a wheel cutter 430 at a rear side, as seen in a direction B, in which the unit moves. Movable unit 410 moves along a space between liquid crystal cells 115 arranged in large format substrate 30 (see FIG. 7). As the unit moves, polarizing plate 106 is cut away by a blade 461. As blade 461, a blade having such a form as a curving knife as shown in FIGS. 11 and 12 is usable.

Furthermore, preferably blade 461 may be held at a portion provided with a heating means (not shown) to heat blade 461. As blade 461 transmits heat, a glue layer bonding polarizing plate 106 and glass substrate 102 together softens to also help to peel the plate off the glass surface. This effect is particularly increased when blade 461 runs slow. Furthermore, while typically the blade may be heated to approximately 50 to 70° C., the optimal temperature is determined by the type of the polarizing plate's glue layer and thus not limited to the above range of temperature.

After blade 461 has cut away polarizing plate 106, glass substrate 102 is exposed in a strip which forms a strip region 411. Blade 461 cutting polarizing plate 106 produces a chip 402a, which is removed along blade 461. The equipment that employs such cutting mechanism 460 can readily form strip region 411. Furthermore to form strip region 411 to have a desired width an identical blade or a blade having an identical geometry may be run more than once. This allows the strip region to have a width larger than that of the blade.

Wheel cutter 430 forms a crack in the glass substrate for dividing the substrate. It has a geometry, as specifically shown in FIGS. 13 and 14. Wheel cutter 430 has a diameter d1 of approximately 2 to 3 mm to ensure that the cutter has strength, and its cutting edge has an angle θ1 of an obtuse angle of approximately 120° to 150° to consider lifetime. Wheel cutter 430 is supported by movable unit 410 via an air cylinder (not shown) to apply a predetermined force against the glass substrate. A distance sensor 440 is a contact sensor detecting a position of an upper surface of polarizing plate 106. By utilizing distance sensor 440, movable unit 410 is controlled to invariably maintain a distance between cutting mechanism 460 and wheel cutter 430, and an upper surface of polarizing plate 106. Distance sensor 440 is not limited to a contact sensor and it may be a non-contact sensor. Furthermore, a wheel unit or a cutter unit may be provided with a pressure-sensitive switch to confirm that it contacts the glass substrate.

Along strip region 411 formed by blade 461 wheel cutter 430 moves to form a crack 412 for division. In strip region 411 crack 412 is formed, as shown in FIG. 15, enlarged.

Figure 10:
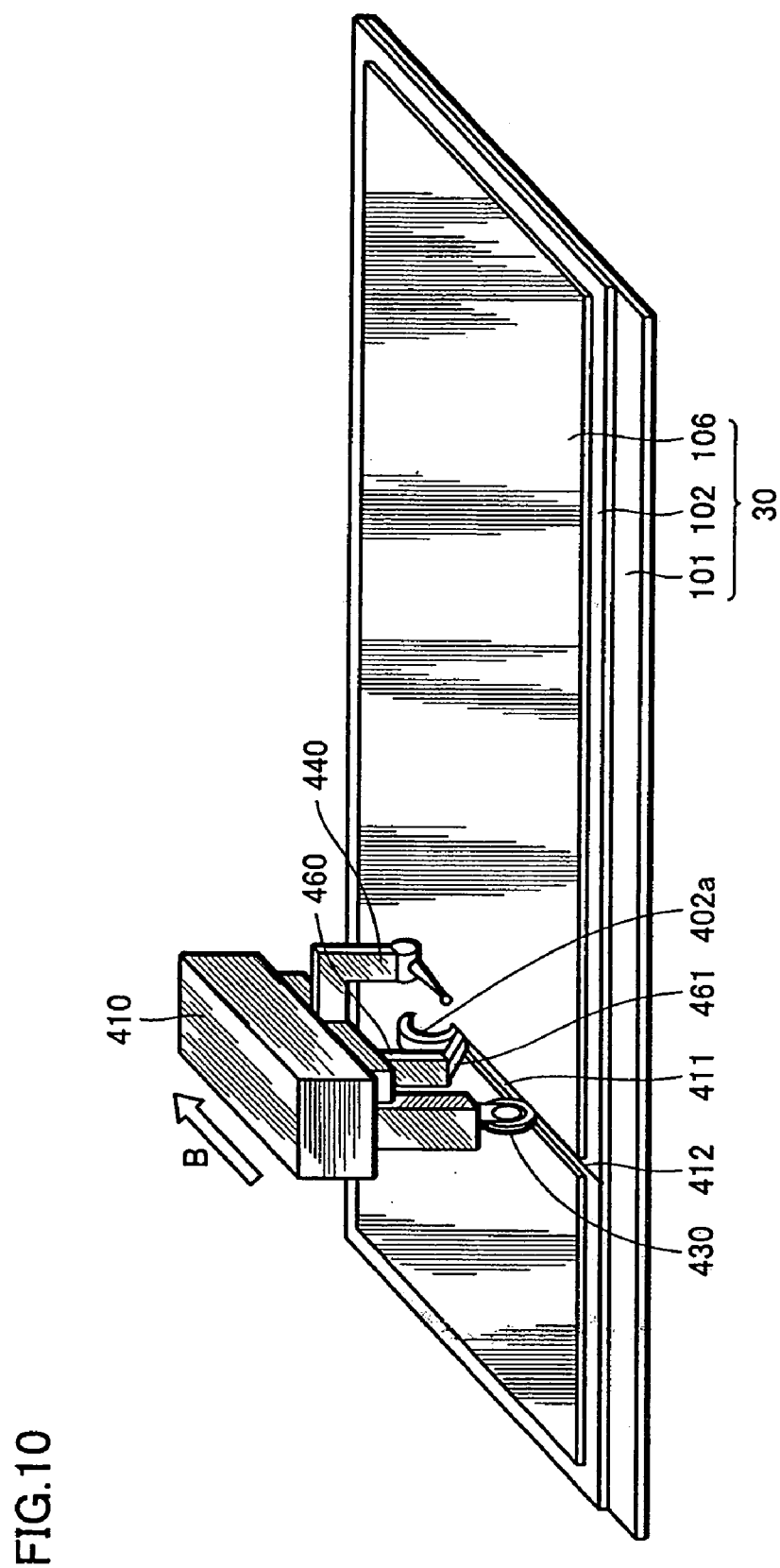
FIG. 10 illustrates equipment for performing the step of dividing that is employed in the method of fabricating the liquid crystal panel in accordance with the present invention in the first embodiment.
Figure 15:
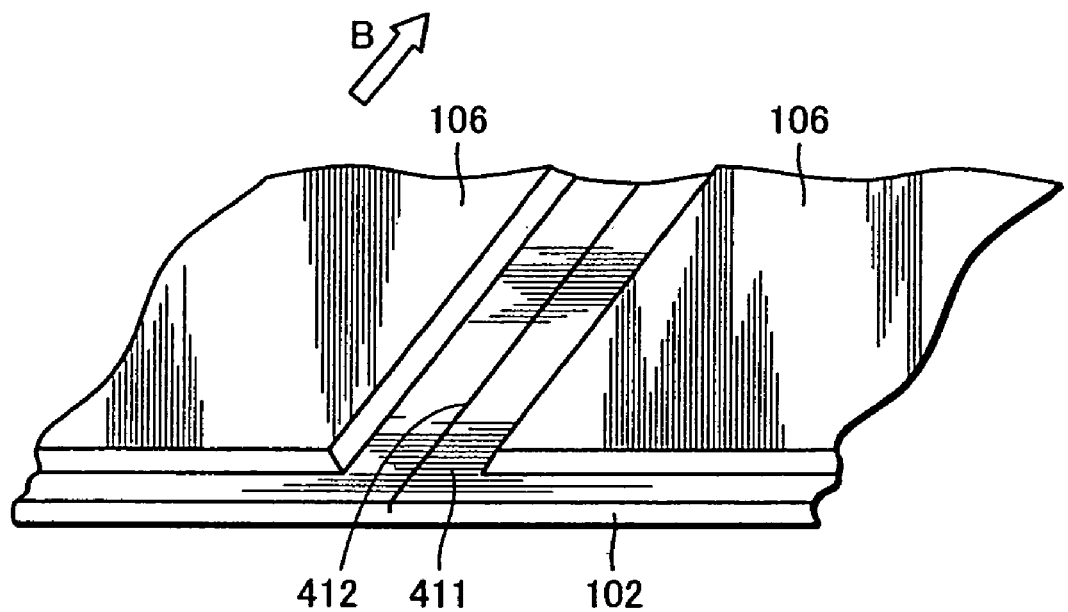
FIG. 15 is a third illustration of the method fabricating the liquid crystal panel in accordance with the present invention in the first embodiment.
Figure 16:
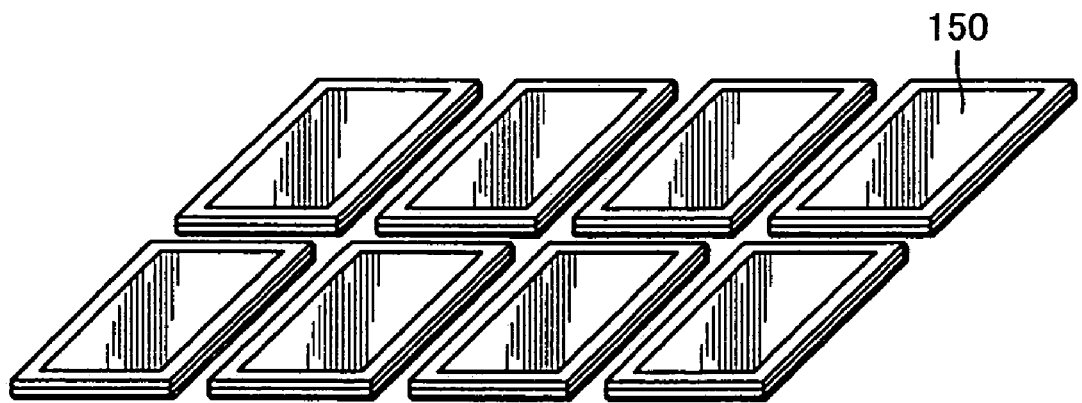
FIG. 16 is a fourth illustration of the method fabricating the liquid crystal panel in accordance with the present invention in the first embodiment.

While the FIGS. 10 and 15 example show that glass substrate 102 is divided, substrate 30, formed of glass substrates 101, 102 stuck together, has front and rear surfaces both subjected to an operation by movable unit 410. In this condition when substrate 30 is subjected to mechanical strength, glass substrates 101, 102 are readily divided, or without any mechanical strength when the glass substrate have a surface scanned by wheel cutter 430 the substrate may be divided of themselves along crack 412. When such equipment is used to divide large format substrate 30, the glass substrates does not crack at an undesired position nor does polarizing plate 106 peel off undesirably so that as shown in FIG. 16, the substrate can efficiently and accurately be divided into individual liquid crystal panels 150. While the FIG. 16 example shows only eight liquid crystal panels 150, the number of the panels is not limited to eight and can be set as appropriate. For example the substrate may be divided into several hundreds of panels.

In the FIG. 10 example, blade 461 for peeling off the polarizing plate and wheel cutter 430, which will be described more specifically hereinafter, for introducing a crack in the glass substrate are provided in a single movable unit 410. Alternatively, a mechanism for peeling off the polarizing plate and that for introducing a crack may be provided as separate movable units.

In the above example the polarizing plate is removed by a blade. Alternatively, it may be removed by a laser. Furthermore, the wheel used to divide the glass substrate may also be replaced with the laser. Thus the laser can provide the both functions. Furthermore, the polarizing plate may be removed and the glass substrate divided by using an appropriate technique other than the laser.

Alternatively, large format substrate formed of substrates stuck together 30 may have removed only a portion of the polarizing plate that corresponds to each liquid crystal panel's boundary, so that the polarizing plate is divided into a plurality of polarizing plates arranged on a surface of large format substrate 30 and corresponding to the liquid crystal panels, respectively, and thereafter large format substrate 30 may be divided to obtain individual liquid crystal panels 150. If this approach is employed, large format substrate 30 can initially be divided into strips rather than individual liquid crystal panels 150 so that liquid crystal cells can undergo an illumination inspection by the strip.

Function and Effect

Figure 17:
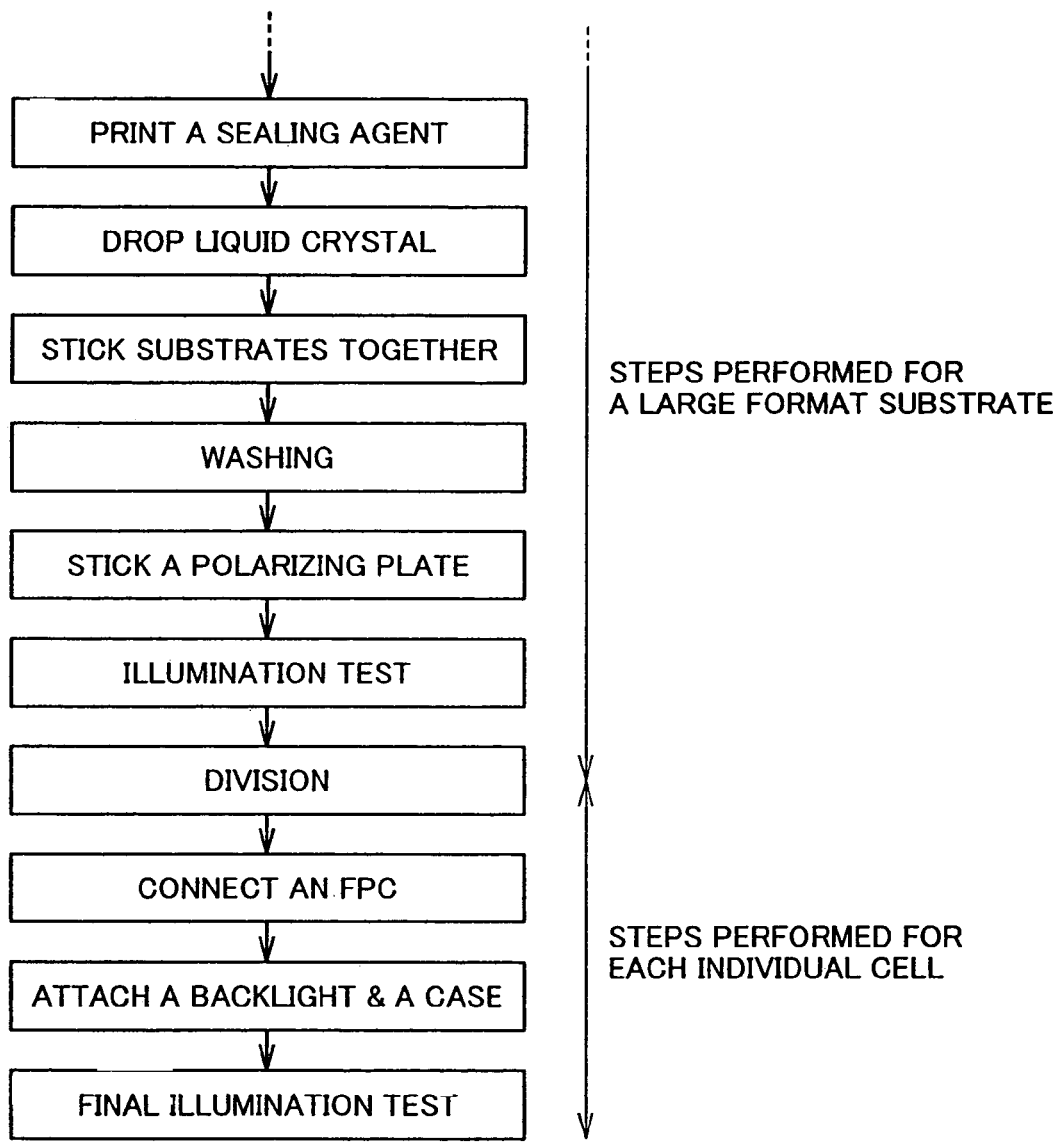
FIG. 17 is a flow chart of the method of fabricating the liquid crystal panel in accordance with the present invention in the first embodiment.

The liquid crystal panel fabrication method in the present embodiment is represented in a flow chart, as shown in FIG. 17. In FIG. 17, the process through to the division step provides a complete liquid crystal panel. Note that FIG. 17 also shows a process performed after a liquid crystal panel is completed. More specifically, a flexible printed circuit (FPC) is connected to a terminal portion of the liquid crystal panel and a backlight and a case are attached to obtain a liquid crystal display device. In the conventional method (see FIG. 31) the substrate is divided at an earlier stage. Accordingly, a large number of steps need to be performed for each individual liquid crystal panel. In the present liquid crystal panel fabrication method, the larger number of steps can be performed for a large format substrate that is not yet divided. This allows a liquid crystal panel and hence a liquid crystal display device to be produced significantly more efficiently. This can provide a significantly reduced time required per liquid crystal panel.

Figure 18:
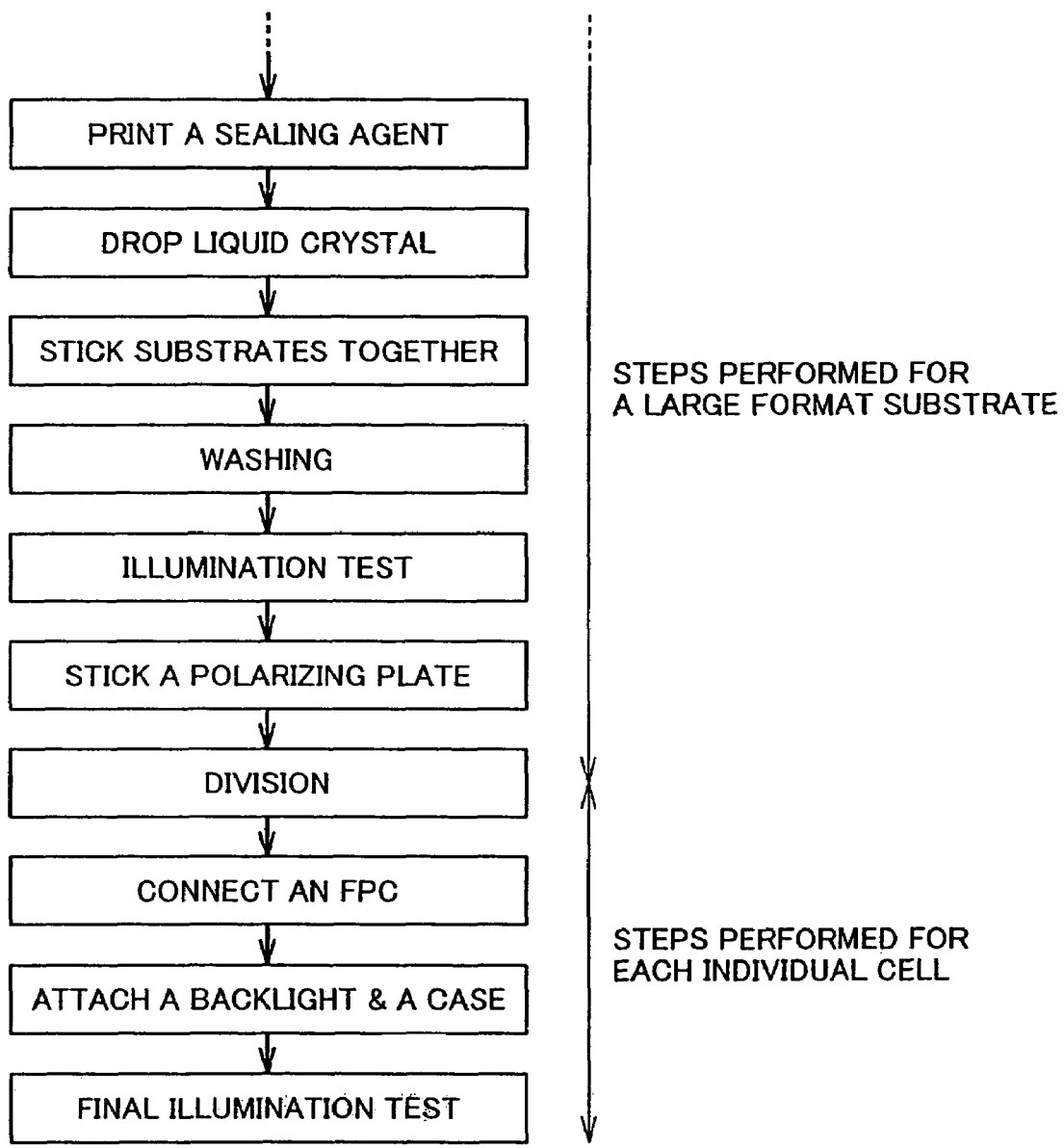
FIG. 18 is a flow chart of an exemplary variation of the method of fabricating the liquid crystal panel in accordance with the present invention in the first embodiment.

While in the above described fabrication method, as shown in FIG. 17, the step of sticking the polarizing plate is followed by an illumination test corresponding to the collective inspection step, the collective inspection step may precede the step of sticking the polarizing plate, as shown in FIG. 18. In that case, desirably, after the collective inspection step and before the step of sticking the polarizing plate a washing step is again performed. Alternatively, in some case, the liquid crystal panel may be completed without performing the collective inspection step.

If the step of exposing the terminal is dividing and partially removing a glass substrate, as shown in FIG. 8, then in any of the systems of FIGS. 17 and 18, a washing step needs to be included after the step of exposing the terminal and before the step of sticking the polarizing plate.

Note that in any of the systems of FIGS. 17 and 18, desirably a washing step is performed after the division as the division step and before the connection of the FPC. The division step may rely on any other appropriate method than that described with reference to FIG. 10.

Second Embodiment

Fabrication Apparatus

Figure 19:
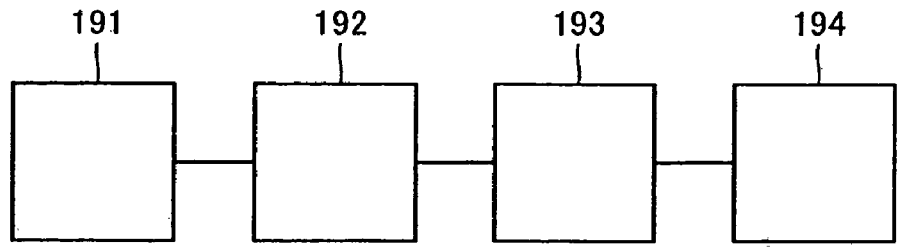
FIG. 19 represents a concept of a liquid crystal panel fabrication apparatus in accordance with the present invention in a second embodiment.

Reference will now be made to FIG. 19 to describe a liquid crystal panel fabrication apparatus in accordance with the present invention. This apparatus includes a liquid crystal dropping portion 191, a substrate sticking portion 192, a polarizing plate sticking portion 193, and a dividing portion 194. Each portion is arranged to be able to operate in liaison with each other. Each portion is not required to be a discrete existence and partial or entire apparatus may serve as more than one of the portions described above. When the apparatus is supplied with a large format glass substrate, liquid crystal dropping portion 191 performs the step of dropping liquid crystal, substrate sticking portion 192 performs the step of sticking substrates together to provide a large format substrate formed of the substrates stuck together with a plurality of liquid crystal cells therebetween. Furthermore the substrate formed of the substrate stuck together is subjected by polarizing plate sticking portion 193 to the step of sticking a polarizing plate. This step is also performed on the large format substrate. Then at dividing portion 194 the large format substrate formed of the stuck substrates is divided into individual liquid crystal panels. This liquid crystal panel fabrication apparatus may include other than each portion described above a collective inspection portion and a washing portion, as appropriate, in accordance with the concept of the liquid crystal panel fabrication method described in the first embodiment.

Third Embodiment

Liquid Crystal Panel

Figure 20:
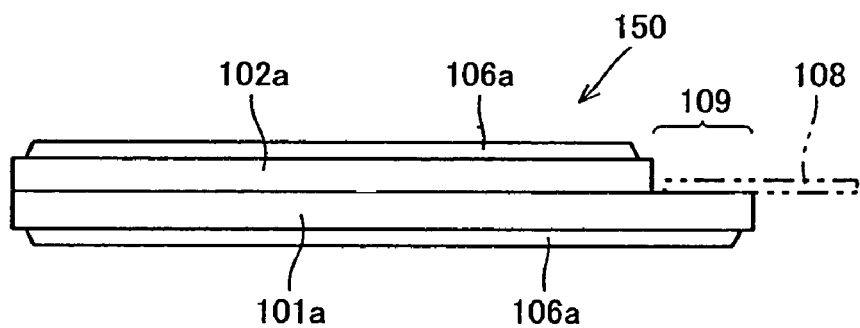
FIG. 20 is a side view of a liquid crystal panel in accordance with the present invention in a third embodiment.
Figure 21:
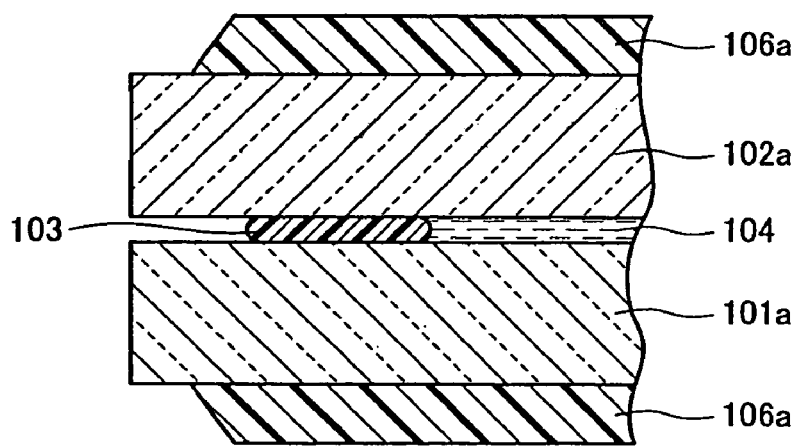
FIG. 21 is a partially enlarged cross section of the liquid crystal panel in accordance with the present invention in the third embodiment.

Reference will be made to FIGS. 20 and 21 to describe a configuration of a liquid crystal panel in accordance with the present invention in a third embodiment. This liquid crystal panel 150 in a side view is shown in FIG. 20. In the figure, thickness is represented exaggerated for the sake of illustration. A liquid crystal cell (not shown) is sandwiched by glass substrates 101a, 102a obtained by dividing glass substrates 101, 102. A polarizing plate 106a is stuck on a side of glass substrate 101a, 102a that is opposite the liquid crystal layer, i.e., on each outer surface. Inherently there is a small gap between glass substrates 101a and 102a and in that gap a liquid crystal layer, a sealing agent and various types of electrodes are arranged, although in FIG. 20 the gap is not shown.

FIG. 21 is an enlarged cross section of an end of liquid crystal panel 150 and therearound. Polarizing plate 106a has an end receding from an end of each glass substrate 101a, 102a and having an inclination. This is attributed to the division step using the equipment shown in FIG. 10 to produce liquid crystal panel 150. As shown in FIG. 15, strip region 411 exposing a surface of the glass substrate is formed, and with polarizing plate 106 having an end surface with an inclination the glass substrates are divided. Accordingly, polarizing plate 106a has an end formed as described above (see FIG. 21).

Figure 23:
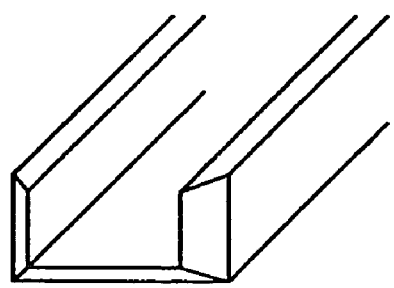
FIG. 23 is a perspective view of an end of a blade exemplarily shown in according with the present invention in the third embodiment.
Figure 24:
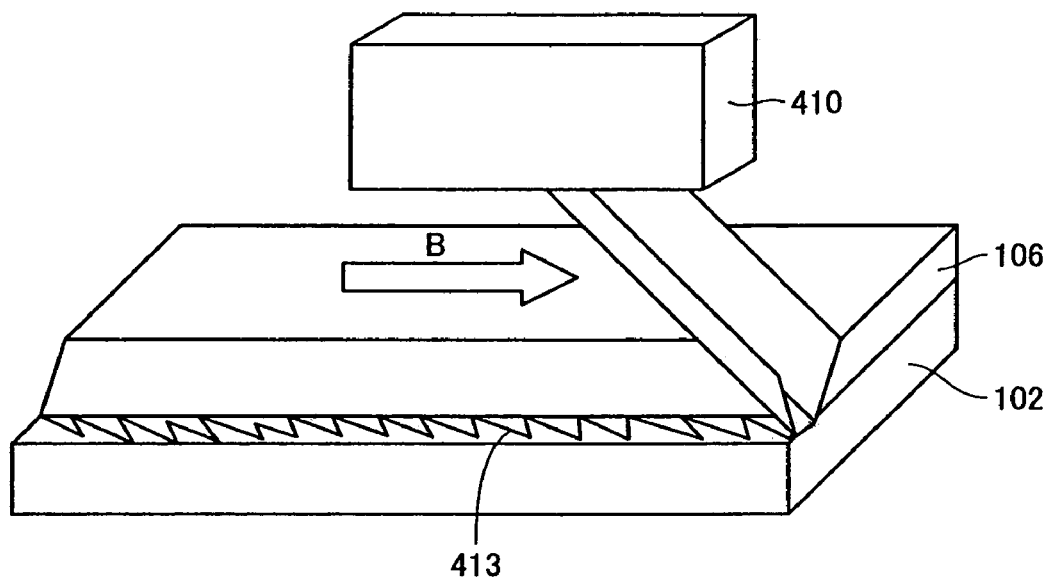
FIG. 24 is a view for illustrating a structure in accordance with the present invention in the third embodiment, as provided by using a blade.

Furthermore a blade that is formed in a horseshoe, as shown in FIG. 23, can prevent the polarizing plate from having an end surface inclined. In that case, in the present invention, with the polarizing plate stuck and thereafter partially removed, a unique trace results. When a blade is used, the blade leaves its race in a vicinity of an end surface of the polarizing plate along an arrow B shown in FIG. 34. For example, as the blade passes, glass substrate 102 has a surface exposed with a trace 413 thereon resulting from the polarizing plate 106 glue layer drawn. If a laser rather than a blade is used to remove the polarizing plate, there will be left a trace of temporary meltage of an end surface of the polarizing plate.

Figure 25:
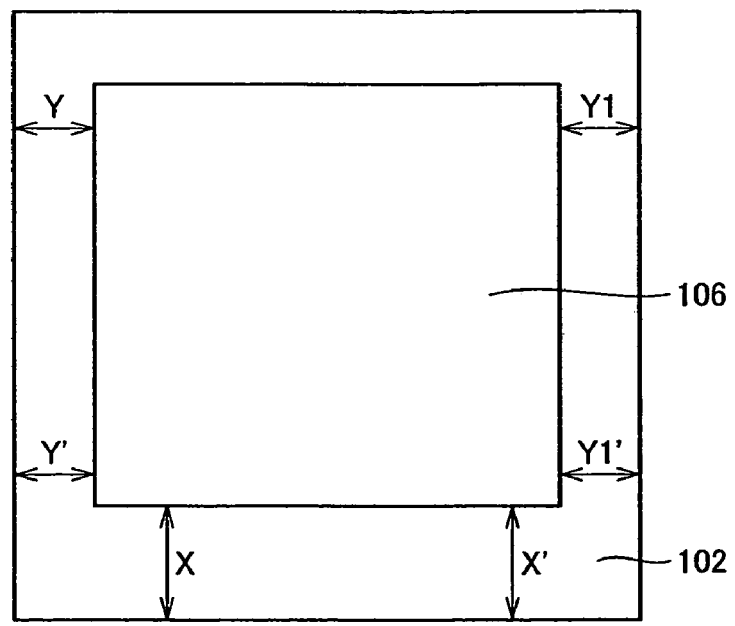
FIG. 25 is a view for illustrating a precision in accordance with the present invention in the third embodiment.

When this method is employed for division to provide a liquid crystal panel, a blade or laser used to remove the polarizing plate and a wheel used to divide the glass substrate that are mounted in a single movable unit 410 and thus coaxially run allow glass substrate 102 and polarizing plate 106 to have their respective end surfaces spaced by a distance maintained constantly with the same precision as that for dividing glass substrate 102, i.e., for example approximately ±50 μm, as shown in FIG. 25. For example, as an index representing a precision of a distance from three sides of polarizing plate 106 to those of glass substrate 102, |X-Y'|, |Y-Y'| and |Y1-Y1'| can all be limited to no more than 100 μm. In conventional fabrication method, the polarizing plate's geometrical error, a sticking error, and the glass substrate's geometrical error are combined together and thus have an effect. As such, it is difficult to provide enhanced precision of a distance from the glass substrate's end surface to the polarizing plate's end surface. In accordance with the present invention, a liquid crystal panel can be fabricated constantly with high precision.

Figure 28C:
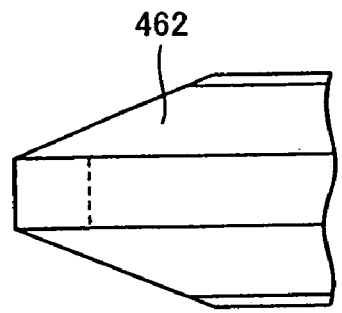
FIGS. 28A-28C are front, side and top views, respectively, of an end of a blade exemplarily shown in accordance with the present invention in the third embodiment for beveling.
Figure 28A:
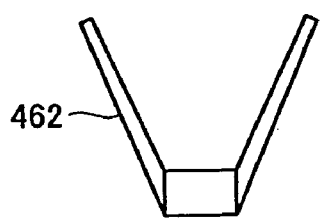
Figure 28B:
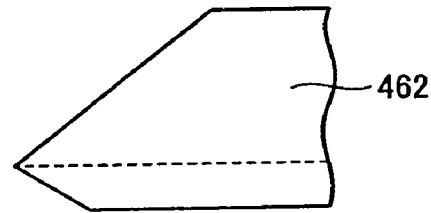
Figure 29:
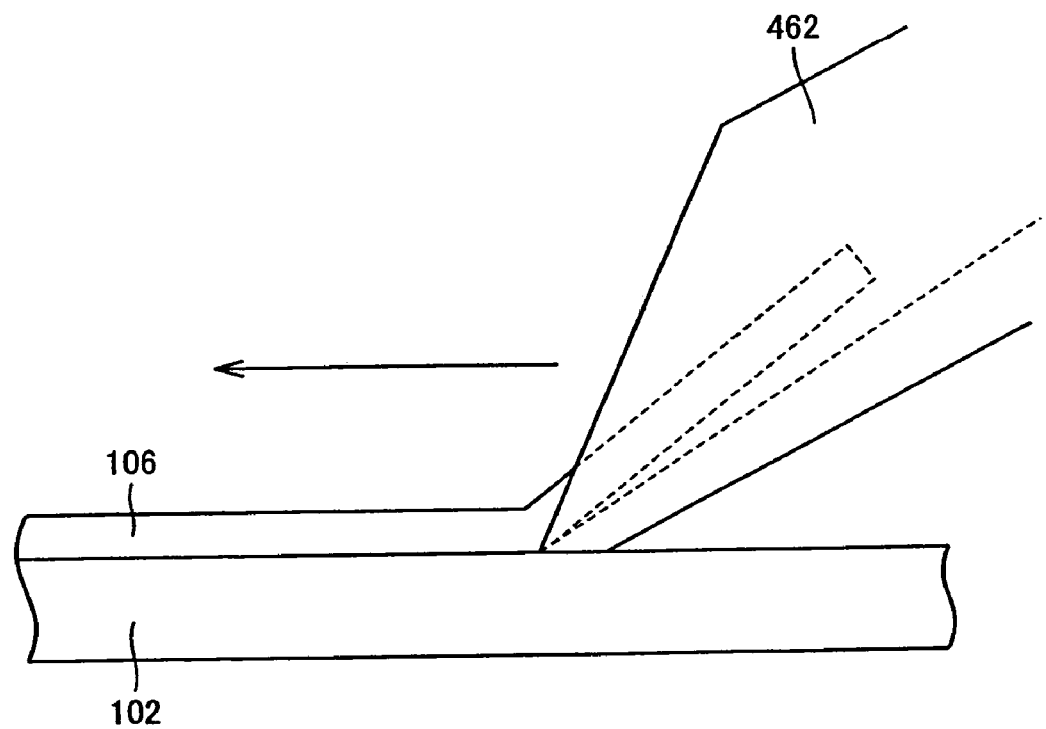
FIG. 29 is a view for illustrating by way of example how the blade shown in FIGS. 28A-28C is used.
Figure 30:
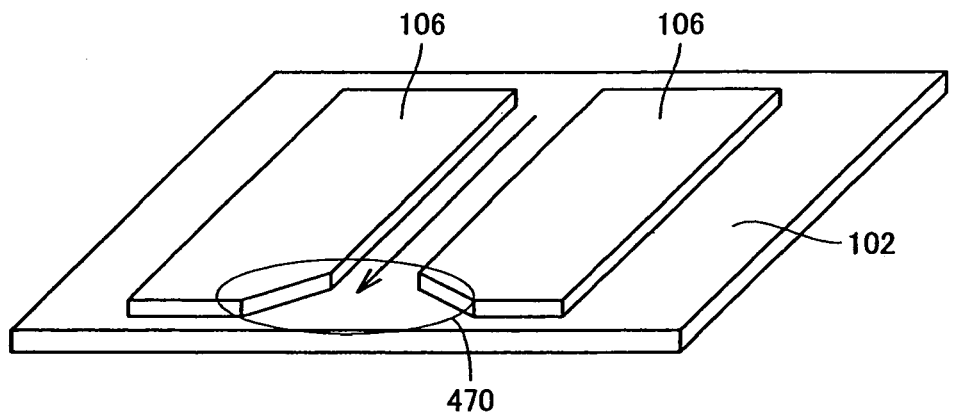
FIG. 30 is a partial, perspective view of beveling in accordance with the present invention in the third embodiment by way of examples.
Figure 31:
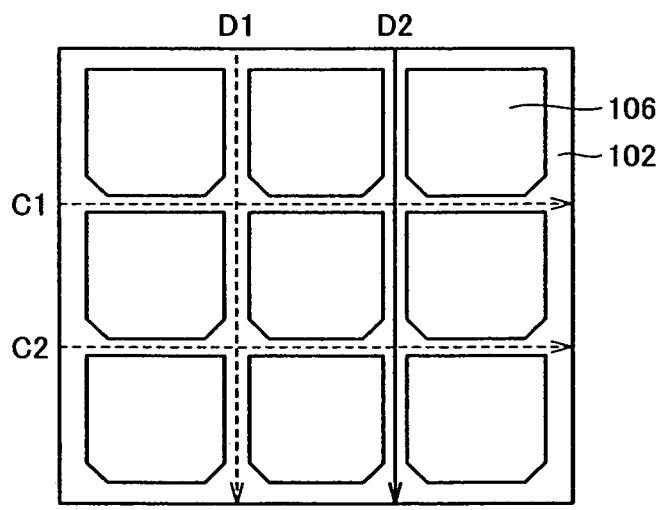
FIG. 31 is a view for illustrating an order in which the blade runs in accordance with the present invention in the third embodiment.
Figure 32:
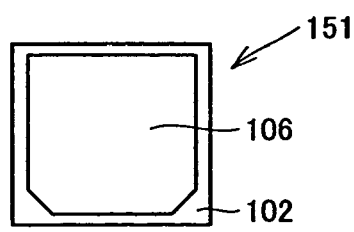
FIG. 32 is a plan view of an exemplary liquid crystal panel obtained by the method of fabricating a liquid crystal panel in accordance with the present invention in the third embodiment.

Furthermore, if a blade 462 such as shown in FIGS. 28A-28C is used to peel off polarizing plate 106 in a strip as shown in FIG. 29, polarizing plate 106 is initially lifted and thus peeled off glass substrate 102 off and then cut by a cutting edge of the blade sandwiching opposite sides thereof. As polarizing plate 106 is initially lifted off and then has opposite sides cut, as shown in FIG. 30, in the region of an outlet 470 as polarizing plate 106 has a center portion lifted by blade 462 a portion thereof having opposite sides still uncut will be torn by tensile strength before it is cut by the blade. As a result, as shown in FIG. 30, a beveled geometry can be obtained, as seen from above. For example, as shown in FIG. 31, when a blade 426 runs in an order of C1, C2, D1 and D2, polarizing plate 106 remaining on glass substrate 102 can have a beveled geometry and an individual liquid crystal panel 151 can be obtained as shown in FIG. 32. Thus beveling polarizing plate 106 of liquid crystal panel 151 can prevent polarizing plate 106 from readily peeling off glass substrate 102 in a subsequent step.

Figure 33:
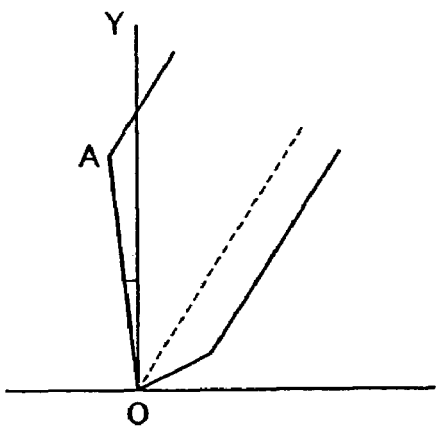
FIGS. 33-38 are first to sixth illustrations, respectively, of how a blade is used in accordance with the present invention in the third embodiment.
Figure 34:
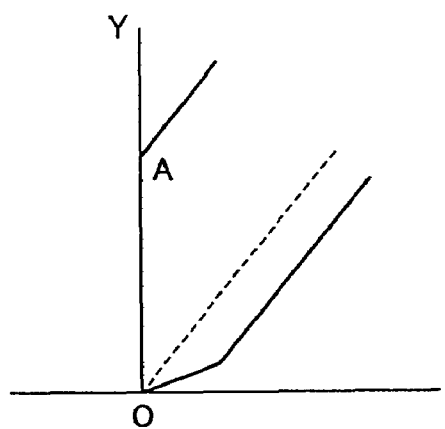
Figure 35:
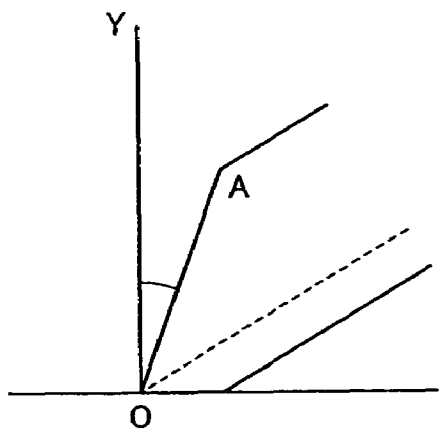
Figure 36:
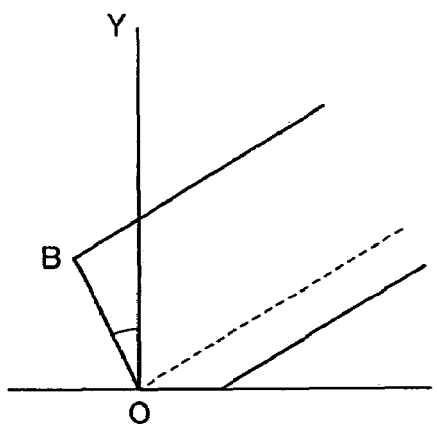
Figure 37:
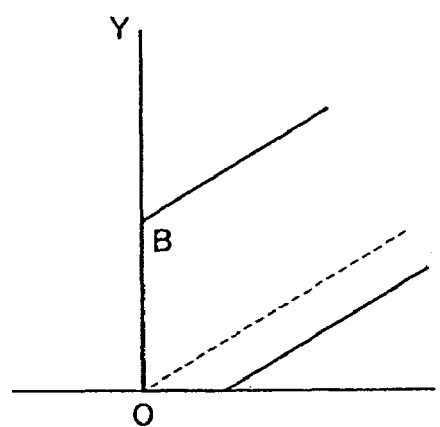
Figure 38:
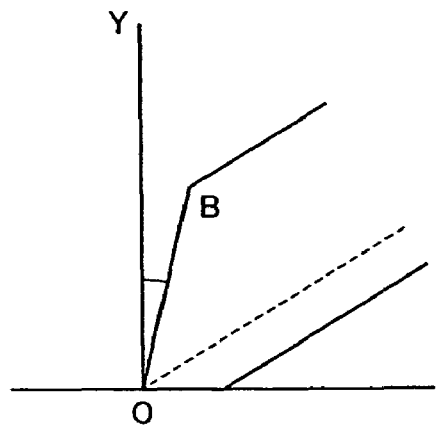
Figure 39:
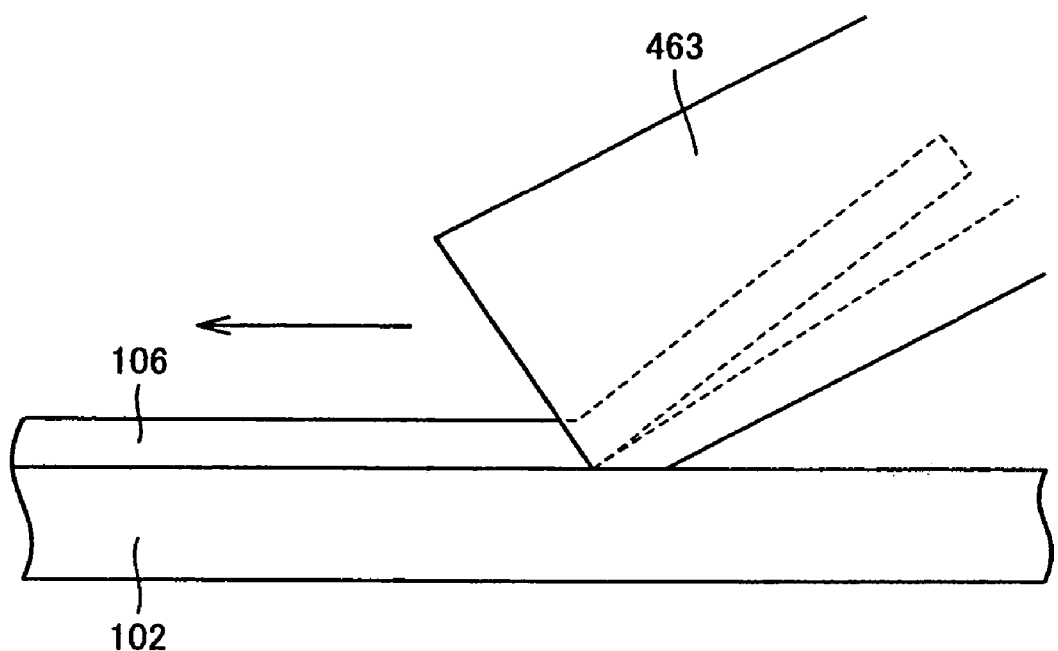
FIG. 39 is an illustration of how a blade in a different form is used in accordance with the present invention in the third embodiment by way of example.

This beveling process may be adjusted in degree by adjusting the blade's position when it runs to change an angle ∠YOA, as shown in FIGS. 33-35. Alternatively, while a blade when it runs has a fixed position, the blade may have geometry adjusted as shown in FIGS. 36-38 to change an angle ∠YOB. If such conditions as shown in FIGS. 33 and 36 are satisfied, the polarizing plate is peeled off after it has opposite sides cut, as shown in FIG. 39. As such, outlet 470 (see FIG. 30) does not have polarizing plate 106 ruptured and hence beveled. If such conditions as shown in FIGS. 35 and 38 are satisfied, the plate is first peeled off and subsequently has opposite sides cut. This causes increased tensile strength between peeling off the plate and cutting it. Consequently rupture occurs and a beveled geometry results. By adjusting ∠YOA and ∠YOB, different degrees of beveling can be selected.

Furthermore for this liquid crystal panel 150 sealing agent 103 surrounds an entire perimeter of the liquid crystal layer continuously. Herein to "surround an entire perimeter continuously" means that a perimeter is surrounded completely without discontinuity by an enclosure.

Furthermore, for this liquid crystal panel 150, as shown in FIG. 20, glass substrates 101a and 102a do not completely overlap. Glass substrate 101a alone protrudes to provide a terminal portion 109 for connection of FPC 108. Terminal portion 109 is also provided with polarizing plate 106a extending on a surface of glass substrate 101a opposite the liquid crystal layer, i.e., a surface opposite that to which FPC 108 is connected.

Figure 26:
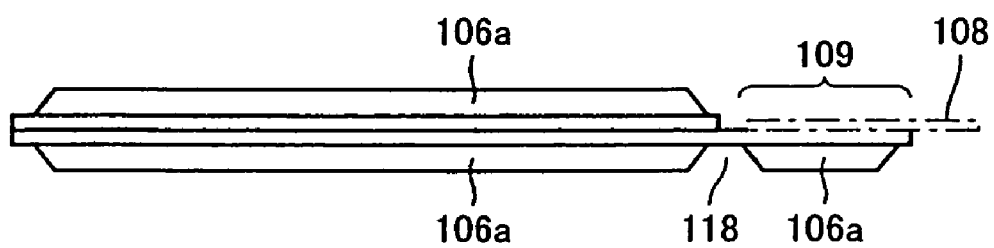
FIG. 26 is a side view of another example of the liquid crystal panel in accordance with the present invention in the third embodiment.
Figure 27:
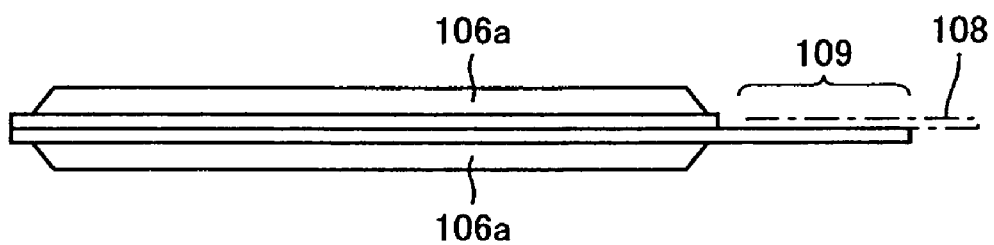
FIG. 27 is a side view of still another example of the liquid crystal panel in accordance with the present invention in the third embodiment.

FPC 108 can be connected by thermal compression bonding. However, the heat applied can deform or discolor polarizing plate 106a located on a surface opposite to that having FPC 108 connected thereto. To address this, as shown in FIG. 26, polarizing plate 106a may be removed between a region corresponding to a rear side of terminal portion 109 having FPC 108 connected thereto and the liquid crystal panel's display area to provide a region for separation 118 to prevent heat applied to terminal portion 109 from being transferred through otherwise existing, underlying polarizing plate 106a and thus negatively affecting the display area. Furthermore, as shown in FIG. 27, terminal portion 109 may have a rear region completely free of polarizing plate 106.

While FIGS. 20 and 21 exemplarily show a structure with two glass substrates both provided with polarizing plate 106a, for some system, aim and the like of the liquid crystal panel, only one of the glass substrates may be provided with the polarizing plate.

Note that while in each embodiment the substrate has been described as a "glass substrate," the substrate is not limited to a glass substrate and may be formed of a different material.

In accordance with the present invention in fabricating a liquid crystal cell and sticking a polarizing plate a large format substrate including a plurality of liquid crystal cells can exactly be used to collectively do so. This can provide a reduced period of time required for per liquid crystal panel so as to effectively produce liquid crystal cells.

Fourth Embodiment

Figure 40:
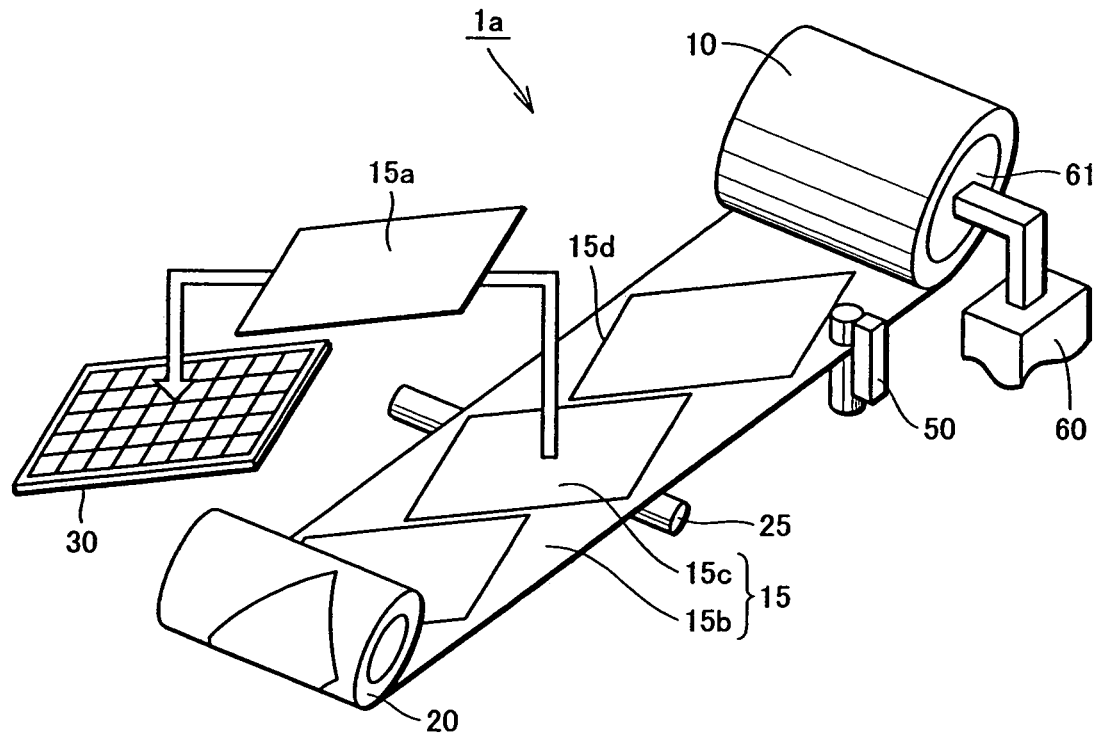
FIG. 40 represents a concept of one embodiment of a polarizing plate sticking apparatus of the present invention.
Figure 41:
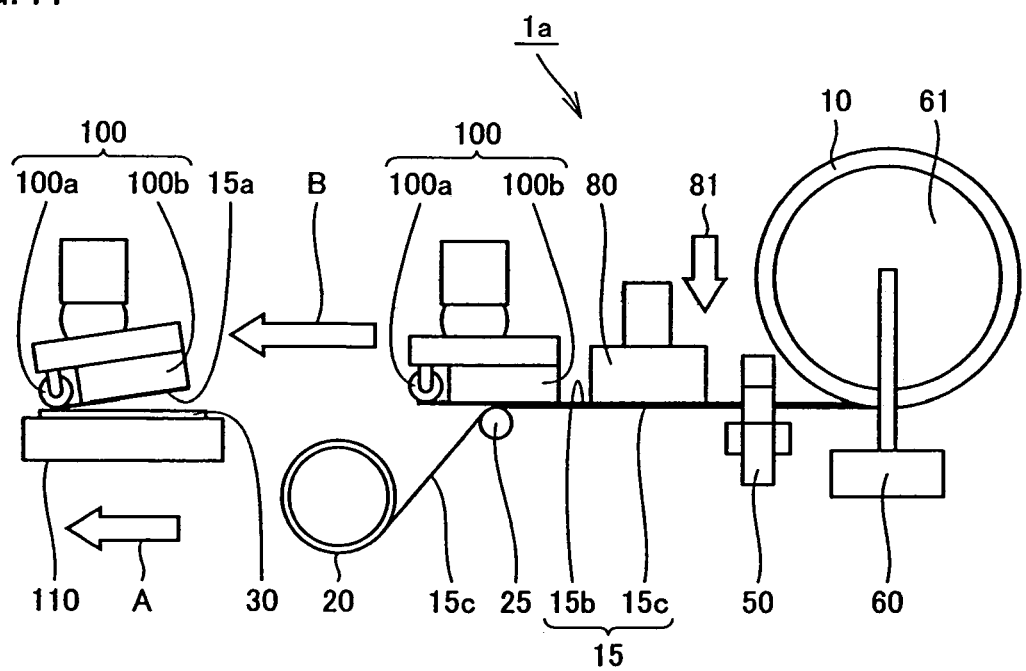
FIG. 41 is a side view of the polarizing plate sticking apparatus of the present invention in a fourth embodiment.

FIG. 40 represents a concept of one example of an apparatus sticking a polarizing plate in accordance with the present invention. FIG. 41 is a side view of the apparatus. With reference to FIGS. 40 and 41, a polarizing plate sticking apparatus 1a includes: a holding means 60 holding a roll 10 of a polarizing plate 15a formed in a strip; a press die 80 serving as a means cutting continuously pulled and thus unrolled polarizing plate 15a to match a geometry of a liquid crystal substrate 30; and a head 100 serving as a means sticking cut polarizing plate 15a on liquid crystal substrate 30.

Roll 10 is a roll of a combination 15 of a separator 15c serving as a support and a polarizing plate 15b formed thereon. Press die 80 cuts polarizing plate 15b alone and does not cut separator 15c.

Apparatus 1a further includes a detector 50 serving as a means detecting an axis of polarization of polarizing plate 15b unrolled. Press die 80 is driven by an axis of polarization detected by detector 50 to adjust a direction followed to cut polarizing plate 15b.

Press die 80 cuts polarizing plate 15b to have substantially the same size as liquid crystal substrate 30. Press die 80 includes a press means.

A reel 61 is attached to holding means 60 and combination 15 is wound around reel 51 to form roll 10. Polarizing plate 15b in combination 15 is fed from roll 10 and before polarizing plate 15b is taken up by a take-up roll 20 detector 50 initially detects an axis of polarization. In accordance with the direction of the axis of polarization press die 80 is adjusted to have an angle for cutting the polarizing plate, and moves in a direction 81 to provide polarizing plate 15b with an incision 15d to cut (half cut) polarizing plate 15b to provide cut polarizing plate 15a. In doing so, separator 15c is not cut. Press die 80 is arranged to have an inclination for example of 45° relative to a direction of unrolled polarizing plate 15b. Press die 80 is set at a desired angle to accommodate the model of interest.

Detector 50 detects a direction of an axis of polarization of polarizing plate 15b. Detector 50 is configured of a light emitting portion, a light receiving portion, and a single sheet of polarizer (not shown). The polarizer is rotated to vary an amount of light passing through polarizing plate 15b and the polarizer. This variation is detected to detect an axis of polarization of polarizing plate 15b.

Polarizing plate 15a cut by press die 80 is sucked by head 100 on a suction platform 10b through vacuum. As it moves past a peeling roller 25, cut polarizing plate 15a alone is separated from separator 15c. After it is completely peeled off separator 15c, polarizing plate 15a sucked by head 100 is moved to a polarizing plate sticking stage 110, as indicated by an arrow B, and placed on large format, liquid crystal substrate 30. Then polarizing plate 15a has an end pressed by a roller 100a of head 100 and stage 110 moves in a direction A to stick polarizing plate 15a on liquid crystal substrate 30. To stick polarizing plate 15a on liquid crystal substrate 30 with high precision, polarizing plate 15 and liquid crystal substrate 30 placed on stage 110 are joined together after on head 100 polarizing plate 15a has an end surface brought into contact with a jig (not shown) to mechanically position the same.

Note that if separator 15c and polarizing plate 15b are completely cut, rather than half cut, on head 100 separator 15c needs to be peeled off by means of an adhesive tape or the like. Peeling roller 25 may be replaced with a flat member, although a roller is desirable since on separator 15c the polarizing plate rolled still remains.

Thus the present invention in the fourth embodiment provides polarizing plate sticking apparatus 1a that allows press die 80 to cut polarizing plate 15b in a geometry corresponding to liquid crystal substrate 30 and then immediately sticks cut polarizing plate 15a by means of polarizing plate sticking head 100. This eliminates the necessity of initially cutting a polarizing plate in an elongate geometry as conventional. The polarizing plate can be stuck on the substrate more efficiently.

When an elongate polarizing plate is stuck directly on liquid crystal substrate 30, as conventional, the polarizing plate is stuck on a portion which does not require it. Accordingly, it needs to be cut to provide a determined geometry. In accordance with the present invention the polarizing plate can be cut only once to correspond to a geometry of liquid crystal substrate 30. The polarizing plate can be stuck only at a desired portion. Furthermore, a reduced number of cutting steps can be provided to stick the polarizing plate more efficiently. Furthermore, the polarizing plate can efficiently be utilized.

Fifth Embodiment

Figure 42:
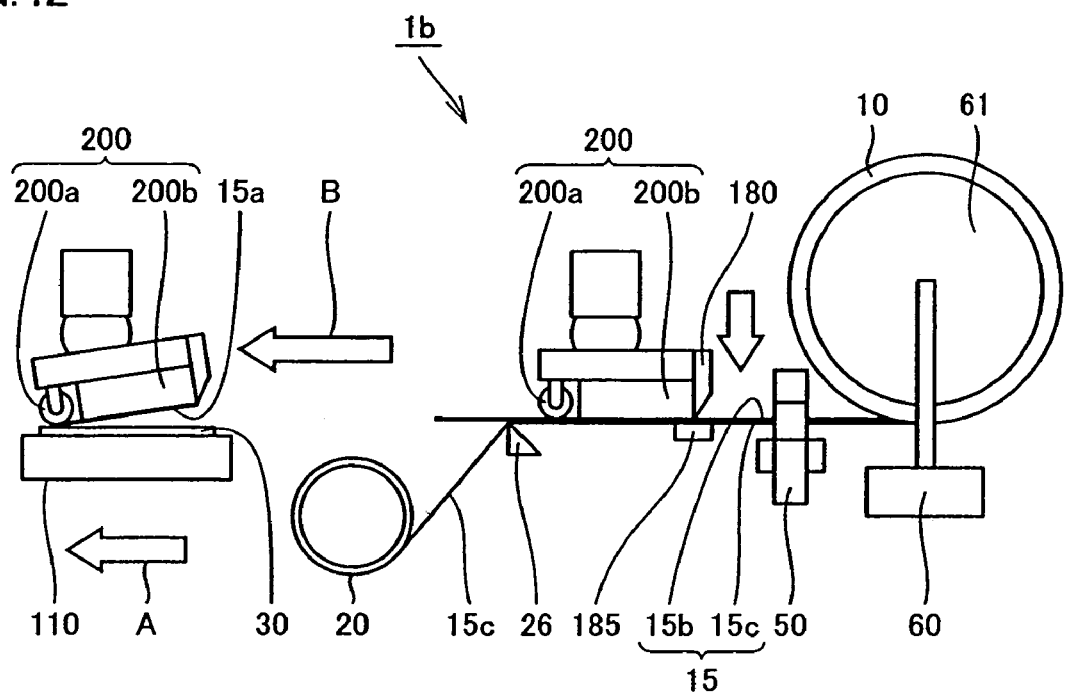
FIG. 42 is a side view of the polarizing plate sticking apparatus of the present invention in a fifth embodiment.

FIG. 42 is a side view of an apparatus sticking a polarizing plate in accordance with the present invention in a fifth embodiment. With reference to FIG. 42, the present invention in the fifth embodiment provides a polarizing plate sticking apparatus 1b including a cutting means formed of a linear blade 180 cutting a polarizing plate. Blade 180 is attached to a head 200 serving as a means sticking cut polarizing plate 15a on liquid crystal substrate 30.

In the fourth embodiment a longitudinal direction of polarizing plate 15b in a strip and a direction of an axis of polarization of polarizing plate 15b in the strip are parallel to each other. To allow each side of cut polarizing plate 15a and an axis of polarization of cut polarizing plate 15a to form an angle of 45°, in the fourth embodiment an inclination of 45° is introduced in cutting polarizing plate 15b. In FIG. 42, unrolled polarizing plate 15b has an axis of polarization previously inclined for example by 45° relative to the longitudinal direction of unrolled polarizing plate 15b. This eliminates the necessity of inclining blade 180 to cut polarizing plate 15b, and polarizing plate 15a thus cut can be stuck on liquid crystal substrate 30. In FIG. 42, polarizing plate 15a is not required to have inclination relative to liquid crystal substrate 30 and can be stuck thereon vertically.

Polarizing plate 15b in the form of a strip is fed from roll 10 and has a direction of an axis of polarization thereof detected by detector 50. Then, polarizing plate sticking head 200 is positionally adjusted. Head 200 has a press roller 200a and a suction platform 200b and by suction platform 200b polarizing plate 15b is sucked and held. Polarizing plate 15b thus sucked is cut on a cutting stage 185 straight by blade 180 provided integral to head 200. In this case, as well as in the fourth embodiment, separator 15c is not cut, i.e., half-cutting is performed.

Thereafter, similarly as has been described in the fourth embodiment, polarizing plate 15a sucked on head 200 is separated from separator 15c as it moves past a peeling member 26. Polarizing plate 15a is placed on a liquid crystal substrate 30 provided in the form of a large size substrate and placed on stage 110. The head 200 roller 200a presses an end of polarizing plate 15a and stage 110 moves in a direction A to stick polarizing plate 15a on liquid crystal substrate 30.

This apparatus allows polarizing plate sticking head 200 and polarizing plate cutting blade 180 to be integrated together. As such, a polarizing plate adapted for a large size substrate can be cut by the apparatus having a reduced size.

As head 200 is positionally aligned, polarizing plate 15a is stuck on liquid crystal substrate 30 obliquely. However, such is not particularly disadvantageous as the polarizing plate has an axis of polarization with a direction adapted for liquid crystal substrate 30.

Polarization sticking apparatus 1b of the present invention in the fifth embodiment is as effective as polarizing plate sticking apparatus 1a of the invention in the fourth embodiment.

Sixth Embodiment

Figure 43:
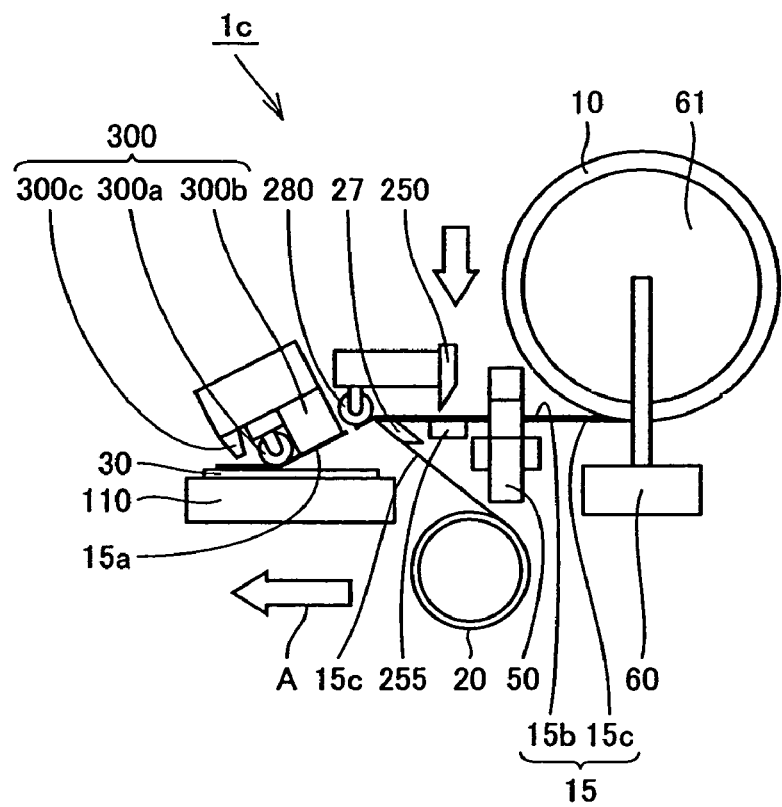
FIG. 43 is a side view of the polarizing plate sticking apparatus of the present invention in a sixth embodiment.

FIG. 43 is a side view of the polarizing plate sticking apparatus of the present invention in a sixth embodiment. With reference to the figure, the sixth embodiment provides a polarizing plate sticking apparatus 1c including: a blade 250 serving as a means cutting in a geometry of liquid crystal substrate 30 polarizing plate 15b continuously unrolled and extracted from roll 10; and head 300 serving as a means sticking cut polarizing plate 15a on liquid crystal substrate 30.

In apparatus 1c, polarizing plate 15b sent from roll 10 has a direction of an axis of polarization detected by detector 50. Note that this direction of the axis of polarization is similar to that in the fifth embodiment. Polarizing plate 15b is cut by blade 250 on a cutting stage 255 and sent by separator 15c.

After it has moved past a peeling member 27, polarizing plate 15a will move straight ahead by its rigidity. However, a guide roller 280 guides the polarizing plate slightly downward. The polarizing plate is guided as it slides under head 300 on a surface of a suction platform 300b and moves past under a press and contact roller 300 until it is detected by a position detection sensor 300c. In doing so, stage 110 is moved to join liquid crystal substrate 30 mounted thereon and polarizing plate 15a together. By moving stage 110 in a direction A, polarizing plate 15a can be stuck on liquid crystal substrate 30. Note that by rotating stage 110 in accordance with a direction of an axis of polarization detected, polarizing plate 15a can be stuck in accordance with an axis of polarization suitable to liquid crystal substrate 30.

As described above, the present invention can provide an apparatus that can stick a polarizing plate on a liquid crystal substrate collectively and hence efficiently. As a result, the cycle time and the number of apparatuses can significantly be reduced.

The embodiments disclosed herein should be considered in all terms as illustrative, not limitative. The scope of the present invention is defined only by the attached claims, not by the description above, and is intended to encompass all modifications within the meaning and scope of the claims and equivalents.

INDUSTRIAL APPLICABILITY

The present invention can achieve a significant contribution in fabricating a large number of liquid crystal panels when it is applied to the process for fabricating the liquid crystal panels. Furthermore the present invention is useful in the process in improving the efficiency of the step of sticking a polarizing plate at a desired portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of fabricating a liquid crystal panel, comprising the steps of:
   placing a sealing agent on a surface of a first substrate in a form of an enclosure;
   introducing liquid crystal on said first substrate in a region enclosed by said sealing agent or on a second substrate in a region corresponding to said region located on said first substrate enclosed by said sealing agent;
   sticking said first substrate and said second substrate together to form a substrate formed of said first substrate and said second substrate;
   sticking a polarizing plate on at least one of said first substrate and said second substrate so said substrate includes the polarizer plate on at least one of said first substrate and said second substrate; and
   after said sticking, dividing said substrate with the polarizer plate(s) thereon to have a geometry providing a plurality of liquid crystal panels, each of the provided plurality of liquid crystal panels thus having the polarizer plate on at least one of said first substrate and said second substrate.

2. The method of claim 1, wherein said dividing includes partially removing a portion of the polarizing plate stuck on said at least one of said first substrate and said second substrate, thereby exposing a surface of said at least one of said first substrate and said second substrate and dividing the substrate in the exposed surface.

3. The method of claim 1, wherein the step of dividing is preceded by the step of collectively, simultaneously inspecting more than one liquid crystal cell defined by said sealing agent, via an interconnection electrically connected to each said liquid crystal cell for inspection.

4. The method of claim 3, wherein the step of inspecting is performed after the step of overlaying and before the step of sticking.

5. The method of claim 3, wherein the step of inspecting is performed after the step of sticking.

6. The method of claim 1, further comprising the step of exposing a terminal portion provided at one of said first and second substrates.

7. The method of claim 6, wherein the step of exposing is performed in the step of overlaying by displacing said substrates from each other.

8. The method of claim 6, wherein the step of exposing is performed after the step of overlaying by dividing and partially removing one of said substrates.

* * * * *